US009644146B2

(12) United States Patent
Mizusaki et al.

(10) Patent No.: US 9,644,146 B2
(45) Date of Patent: May 9, 2017

(54) COMPOSITION FOR FORMING LIQUID CRYSTAL LAYER, LIQUID CRYSTAL DISPLAY DEVICE, AND METHOD FOR PRODUCING LIQUID CRYSTAL DISPLAY DEVICE

(75) Inventors: Masanobu Mizusaki, Osaka (JP); Yuichiro Yamada, Osaka (JP); Satoshi Enomoto, Chiba (JP); Yuki Hara, Chiba (JP); Hideo Kikuchi, Tokyo (JP)

(73) Assignees: Sharp Kabushiki Kaisha, Osaka (JP); Toyo Gosei Co., Ltd., Chiba (JP)

( * ) Notice: Subject to any disclaimer, the term of this patent is extended or adjusted under 35 U.S.C. 154(b) by 584 days.

(21) Appl. No.: 13/821,412

(22) PCT Filed: Jul. 14, 2011

(86) PCT No.: PCT/JP2011/066159
§ 371 (c)(1),
(2), (4) Date: Mar. 7, 2013

(87) PCT Pub. No.: WO2012/032857
PCT Pub. Date: Mar. 15, 2012

(65) Prior Publication Data
US 2013/0169916 A1 Jul. 4, 2013

(30) Foreign Application Priority Data
Sep. 7, 2010 (JP) .................................. 2010-200147

(51) Int. Cl.
G02F 1/1333 (2006.01)
C09K 19/56 (2006.01)
C09K 19/14 (2006.01)
C09K 19/32 (2006.01)
C08F 220/30 (2006.01)
C09K 19/04 (2006.01)
G02F 1/1337 (2006.01)

(52) U.S. Cl.
CPC ............ C09K 19/56 (2013.01); C08F 220/30 (2013.01); C09K 19/14 (2013.01); C09K 19/32 (2013.01); G02F 1/133365 (2013.01); C09K 2019/0448 (2013.01); G02F 1/133788 (2013.01); G02F 2001/133726 (2013.01)

(58) Field of Classification Search
CPC ........ C09K 19/32; C09K 19/14; C09K 19/56; C09K 2019/0448; G02F 1/133788; G02F 1/133365; G02F 2001/133726; C08F 220/30
USPC ............ 252/299.01, 299.6, 299.63; 428/1.1; 349/182, 183
See application file for complete search history.

(56) References Cited

U.S. PATENT DOCUMENTS

| 7,169,449 | B2 | 1/2007 | Nakanishi et al. |
|---|---|---|---|
| 8,551,358 | B2 | 10/2013 | Lee et al. |
| 2003/0067579 | A1 | 4/2003 | Inoue et al. |
| 2003/0086044 | A1 | 5/2003 | Inoue et al. |
| 2004/0169790 | A1 | 9/2004 | Inoue et al. |
| 2004/0174471 | A1 | 9/2004 | Nakanishi et al. |
| 2004/0246406 | A1 | 12/2004 | Inoue et al. |
| 2004/0263719 | A1 | 12/2004 | Inoue et al. |
| 2005/0018105 | A1 | 1/2005 | Inoue et al. |
| 2005/0024556 | A1 | 2/2005 | Nakahata et al. |
| 2005/0030445 | A1 | 2/2005 | Inoue et al. |
| 2005/0116200 | A1 | 6/2005 | Nakanishi et al. |
| 2005/0253988 | A1 | 11/2005 | Inoue et al. |
| 2005/0264737 | A1 | 12/2005 | Kataoka et al. |
| 2007/0182887 | A1 | 8/2007 | Haga et al. |
| 2008/0090026 | A1 | 4/2008 | Bernatz et al. |
| 2008/0179565 | A1 | 7/2008 | Hsieh et al. |
| 2008/0293888 | A1 | 11/2008 | Bachels et al. |
| 2008/0316406 | A1 | 12/2008 | Inoue et al. |
| 2009/0002858 | A1 | 1/2009 | Okutsu et al. |
| 2009/0141215 | A1 | 6/2009 | Bremer et al. |
| 2010/0253605 | A1 | 10/2010 | Inada |
| 2011/0051049 | A1 | 3/2011 | Goetz et al. |
| 2011/0058134 | A1 | 3/2011 | Inoue et al. |
| 2011/0164213 | A1 | 7/2011 | Nakanishi et al. |
| 2011/0199566 | A1 | 8/2011 | Mazusaki et al. |
| 2011/0267574 | A1 | 11/2011 | Kawahira et al. |
| 2012/0033167 | A1 | 2/2012 | Mizusaki et al. |
| 2012/0076952 | A1 | 3/2012 | Bachels et al. |
| 2013/0004679 | A1 | 1/2013 | Bachels et al. |
| 2013/0128202 | A1 | 5/2013 | Mizusaki et al. |
| 2013/0128203 | A1 | 5/2013 | Mizusaki et al. |
| 2013/0128204 | A1 | 5/2013 | Mizusaki et al. |
| 2013/0135570 | A1 | 5/2013 | Mizusaki et al. |
| 2013/0169906 | A1 | 7/2013 | Nakanishi et al. |
| 2013/0169916 | A1 | 7/2013 | Mizusaki |
| 2013/0271712 | A1* | 10/2013 | Mizusaki ................ 349/123 |
| 2013/0286340 | A1 | 10/2013 | Mizusaki et al. |

FOREIGN PATENT DOCUMENTS

| CN | 1664657 | 9/2005 |
|---|---|---|
| CN | 101108968 | 1/2008 |
| CN | 101008784 | 1/2011 |
| JP | 63-233952 | 9/1988 |
| JP | 6-18898 | 1/1994 |

(Continued)

OTHER PUBLICATIONS

International Search Report for PCT/JP2011/066159 mailed Sep. 6, 2011.

(Continued)

Primary Examiner — Geraldina Visconti
(74) Attorney, Agent, or Firm — Nixon & Vanderhye P.C.

(57) ABSTRACT

The present invention provides a composition for forming a liquid crystal layer which enables to achieve takt time reduction and high display quality. The liquid crystal display device according to the present invention includes a liquid crystal material, and a monomer, the monomer being a compound having a structure that generates ketyl radicals when undergoing a hydrogen abstraction reaction caused by exposure to light.

20 Claims, 1 Drawing Sheet

(56) References Cited

FOREIGN PATENT DOCUMENTS

| | | |
|---|---|---|
| JP | 9-227454 | 9/1997 |
| JP | 9-255706 | 9/1997 |
| JP | 10-338880 | 12/1998 |
| JP | 2002-323701 | 11/2002 |
| JP | 2003-177418 | 6/2003 |
| JP | 2003-307720 | 10/2003 |
| JP | 2005-31288 | 2/2005 |
| JP | 2005-221617 | 8/2005 |
| JP | 2005-338613 | 12/2005 |
| JP | 2006-058775 | 3/2006 |
| JP | 2006-317896 | 11/2006 |
| JP | 2008-116931 | 5/2008 |
| JP | 2008-134666 | 6/2008 |
| JP | 4175826 | 8/2008 |
| JP | 2009-520702 | 5/2009 |
| JP | 2009-132718 A | 6/2009 |
| JP | 2010-107537 | 5/2010 |
| WO | WO 2008/078629 | 7/2008 |
| WO | WO 2009/118086 | 10/2009 |
| WO | WO 2010/026721 | 3/2010 |
| WO | WO 2010/041665 | 4/2010 |
| WO | WO 2010/047011 | 4/2010 |
| WO | 2010-079703 A1 | 7/2010 |
| WO | WO 2010/116564 | 10/2010 |

OTHER PUBLICATIONS

K. Maruyama et al., "The Photochemical Reaction of α-Diketones", Bulletin of the Chemical Society of Japan, Mar. 1972, vol. 45 pp. 847-851.
International Search Report for PCT/JP2011/067049 mailed Sep. 6, 2011.
S. Mery et al., Liquid Crystals Containing a 2,6-Distributed Anthracene Core-Mesomorphism, Charge Transport and Photochemical Properties, Journal of Materials Chemistry, 2003, 1622-1630.
Restriction Requirement mailed Sep. 18, 2014 in U.S. Appl. No. 13/813,772.
Restriction Requirement mailed Oct. 8, 2014 in U.S. Appl. No. 13/814,055.
Restriction Requirement mailed Sep. 5, 2014 in U.S. Appl. No. 13/813,828.
Office Action mailed Oct. 24, 2014 in U.S. Appl. No. 13/814,025.
International Search Report mailed Oct. 4, 2011 in PCT/JP2011/070009.
International Search Report for PCT/JP2011/079706, mailed Apr. 3, 2012.
International Search Report for PCT/JP2011/078159 mailed Jan. 24, 2012.
U.S. Office Action mailed Dec. 4, 2014 in U.S. Appl. No. 13/814,055.
U.S. Office Action mailed Dec. 10, 2014 in U.S. Appl. No. 13/813,772.
International Search Report for PCT/JP2011/067052, mailed Sep. 6, 2011.
International Search Report for PCT/JP2011/067047 mailed Sep. 6, 2011.
International Search Report for PCT/JP2011/067051 mailed Sep. 6, 2011.
U.S. Office Action mailed Dec. 15, 2014 in U.S. Appl. No. 13/813,828.
U.S. Office Action mailed Jan. 22, 2015 in U.S. Appl. No. 13/991,489.
U.S. Office Action mailed Feb. 13, 2015 in U.S. Appl. No. 13/814,025.
U.S. Office Action mailed Mar. 13, 2015 in U.S. Appl. No. 13/721,322.
U.S. Office Action mailed Nov. 6, 2014 in U.S. Appl. No. 13/721,322.

* cited by examiner

COMPOSITION FOR FORMING LIQUID CRYSTAL LAYER, LIQUID CRYSTAL DISPLAY DEVICE, AND METHOD FOR PRODUCING LIQUID CRYSTAL DISPLAY DEVICE

This application is the U.S. national phase of International Application No. PCT/JP2011/066159 filed 14 Jul. 2011 which designated the U.S. and claims priority to JP 2010-200147 filed 7 Sep. 2010, the entire contents of each of which are hereby incorporated by reference.

TECHNICAL FIELD

The present invention relates to a composition for forming a liquid crystal layer, a liquid crystal display device, and a method for producing a liquid crystal display device. The present invention relates particularly to a composition for forming a liquid crystal layer which is for forming a polymer layer on an alignment film in order to maintain the alignment control capability for a liquid crystal for a long time, a liquid crystal display device in which a polymer layer is formed on an alignment film, and a method for producing a liquid crystal display device suitable for forming a polymer layer on an alignment film.

BACKGROUND ART

Liquid crystal display (LCD) devices are display devices which control transmission/blocking of light (on/off of image display) by controlling the alignment of liquid crystal molecules having birefringence. Examples of display systems of LCD include twisted nematic (TN) mode in which liquid crystal molecules having positive dielectric anisotropy are twist aligned in the thickness direction of a liquid crystal layer; vertical alignment (VA) mode in which liquid crystal molecules having negative dielectric anisotropy are aligned vertically to a substrate surface; and in-plane switching (IPS) mode in which liquid crystal molecules having positive dielectric anisotropy are aligned horizontally to a substrate surface, and then a lateral electric field is applied to a liquid crystal layer.

Since LCDs are thin, light, and consume little power, and are therefore widely used as display equipment for televisions, personal computers, PDAs, and the like. Particularly in recent years, upsizing of liquid crystal display devices has been rapidly progressing, as represented by liquid crystal display devices for televisions and the like. For upsizing, the multidomain vertical alignment (MVA) mode is suitably used which can be produced in a high yield even if the device has a large area, and has a wide view angle. The multidomain vertical alignment mode is a mode in which liquid crystals having negative dielectric anisotropy are vertically aligned, and banks (line-shaped protrusion) formed on substrates or notches (slits) in electrodes are provided as structures for alignment control. In MVA mode, due to presence of such structures for alignment control, even if the alignment film has not undergone a rubbing treatment, the alignment direction of liquid crystals under application of a voltage can be controlled in a plurality of directions. Thus, MVA mode has a wider viewable angle as compared to conventional TN mode.

However, MVA mode has a problem that the display is dark. The main cause is as follows: Areas where linear protrusions (ribs) or slits are formed are overlapped with boundaries of alignment divisions to generate dark lines, and the dark lines reduce the transmittance during white display, resulting in a dark display. This problem is solved when the distances among ribs are sufficiently large. However, the number of the ribs which are alignment-controlling structures is reduced. As a result, a longer time is required for stability of the alignment of liquid crystals after application of a predetermined voltage, problematically increasing the response time. In order to solve the above problems and to enable high luminance and high-speed response, a technology for providing pretilt angles by use of polymers (hereinafter, also referred to as PSA (polymer sustained alignment) layers) is proposed (for example, Patent Literatures 1 to 5).

In PSA technology, a liquid crystal composition in which polymerizable components such as a monomer and an oligomer are mixed in a liquid crystal is enclosed between substrates, and the polymerizable components are polymerized in a state in which liquid crystal molecules are tilted by impressing a voltage between the substrates. Thereby, the liquid crystal has a predetermined pre-tilt angle even if the voltage impression is eliminated, and a liquid crystal alignment direction can be established. The polymerization of the polymerizable components is carried out by heat or exposure to light (ultraviolet light). Use of the PSA technology makes ribs unnecessary and improves the aperture ratio, and simultaneously imparts a pre-tilt angle smaller than 90° over an entire display region, enabling high-speed response.

Formation of a polymer wall between a pair of substrates in a liquid crystal display device has been known as a method for controlling the alignment of liquid crystals (for example, Patent Literature 5). The polymer wall in the method is a structure formed to surround a liquid crystal layer. Such a structure is substantially different from a PSA layer which is a thin layer formed on an alignment film.

CITATION LIST

Patent Literature

Patent Literature 1: JP 4175826 B
Patent Literature 2: JP 2005-221617 A
Patent Literature 3: JP 2005-338613 A
Patent Literature 4: JP 2008-116931 A
Patent Literature 5: JP H9-255706 A
Patent Literature 6: JP 2006-058775 A

Non-Patent Literature

Non-Patent Literature 1: Bulletin of the Chemical Society of Japan, vol. 45, 847-851, 1972

SUMMARY OF INVENTION

Technical Problem

According to the investigations by the inventors of the present application, a pre-tilt angle-imparting technology using a PSA layer has some problems relating to display unevenness that occurs when images are displayed on a produced LCD. Problematically, display unevenness occurs in images displayed on a produced LCD due to liquid crystal alignment defects. Such alignment defects occur locally when the tilt angle of liquid crystal molecules is changed by voltage application during polymerization of monomers. The degree of the display unevenness differs depending on the monomers to be used. Monomers that are soluble in liquid crystal materials are not always suitable for formation of PSA layers. Moreover, it is reported that, even without addition of a photopolymerization initiator, typically IRGA-CURE 651 (produced by BASF), a polymer layer can have vertical alignment property by the following method: A composition containing monomers for PSA layer formation is injected into a cell; the cell is irradiated with light while a voltage is applied thereto; and the monomers are polymerized by exposure to ultraviolet light for a long time. In this case, occurrence of image unevenness is reduced more than the case where a polymerization initiator is used. Thus, products with better image quality tend to be obtained. However, productivity is problematically reduced due to increase in the takt time.

If polymerization initiator is added to reduce polymerization time, the takt time is reduced. In such case, however, defects in the performance as a display including display unevenness are reported. Thus, achievement of both high display quality and takt time reduction is difficult by simply adding a polymerization initiator. For achieving both high display quality and takt time reduction, an attention has been paid to methods for forming a PSA layer by photo polymerization without using a conventional polymerization initiator. In such methods, a problem relating to takt time reduction has been remained unsolved due to unclear polymerization mechanism.

The present invention has been made in consideration of the above current situation, and aims to provide a composition for forming a liquid crystal layer which enables to achieve takt time reduction and high display quality.

Solution to Problem

The inventors have made various studies concerning factors that cause image sticking in liquid crystal display. As a result, they have found that, if a polymerization initiator that causes self-cleavage upon exposure to light such as IRGACURE 651, a reported example, is used, impurities easily chargeable by the self-cleavage remain in a liquid crystal layer. Thus, a DC offset voltage is generated inside a cell, which disturbs the arrangement of liquid crystals even if a voltage is applied. Consequently, image sticking occurs.

The inventors found an effective method to reduce the takt time while maintaining high display quality. The method includes addition of benzophenone, acetophenon, or the like as a material for a PSA layer in liquid crystal materials, and causing a hydrogen abstraction reaction by exposure to light to generate ketyl radicals. Benzophenone and acetophenone abstract hydrogen from coexisting compounds, or the like so that they generate ketyl radicals. Therefore, no impurities derived from a polymerization initiator of self-cleavage type are generated in the liquid crystals. Accordingly, degradation of the display quality such as display unevenness and image sticking can be prevented, and at the same time the takt time can be reduced. Moreover, since various derivatives of benzophenone and acetophenon are available at low cost, and they also can be easily synthesized, derivatives of these compounds including polymerizable groups can be easily produced. As mentioned earlier, by allowing a compound that generates ketyl radicals to function as a polymerization initiator and using such a compound as a polymerization compound for forming a PSA layer, the polymerization initiator itself can be phase-separated from the liquid crystals to form a PSA layer. According to this method, the takt time can be dramatically reduced, and at the same time liquid crystal display panels with high display quality can be produced as compared with a conventional method using no polymerization initiator. The present inventors thus successfully solved the aforementioned problems, and thereby they completed the present invention.

That is, one aspect of the present invention is a composition for forming a liquid crystal layer including a liquid crystal material, and a monomer, the monomer being a compound having a structure that generates ketyl radicals when undergoing a hydrogen abstraction reaction caused by exposure to light.

The ketyl radicals herein refer to radicals that are generated when a carbonyl compound abstracts hydrogen atoms by light excitation from a hydrogen atom donor.

Examples of the compound that generates ketyl radicals include compounds having a benzophenone structure, a fluorenone structure, a thioxanthone structure, a benzyl structure, or an acetophenon structure in the molecule thereof.

Patent Literature 6 mentioned above describes degradation of parts (for example, alignment film and liquid crystal layer) of a liquid crystal display device caused by exposure to short wavelength ultraviolet light. The present inventors have found the following: The compounds which generate ketyl radicals and have a benzophenone structure absorb light having a wavelength of not less than 350 nm, and those which have a fluorenone, thioxanthone, or benzyl structure absorb light having a wavelength of not less than 400 nm. Therefore, polymerization can be initiated by exposure to long wavelength light, and irradiation of short wavelength components is not necessary. Thus, degradation can be avoided.

With regard to the compounds that generate ketyl radicals and have a benzyl structure among the ketyl radical-generating compounds, hydrogen abstraction reaction caused by exposure to light to generate ketyl radicals preferentially proceeds in the presence of a hydrogen atom donor. It is widely known that, in the absence of a hydrogen atom donor, those compounds perform light cleavage so that they have radical-generating properties (for example, Non-Patent Literature 1).

Examples of the hydrogen atom donor include ethers, amines, thiols, or alcohol each having an alkyl group, alkenyl group, or aralkyl group.

The composition for forming a liquid crystal layer of the present invention includes a monomer that generates ketyl radicals upon exposure to light to cause polymerization. Therefore, addition of a polymerization initiator is not necessary, and the polymerization proceeds in a short time. Also, no impurities derived from polymerization initiators are generated. Therefore, a residual DC voltage rarely occurs in a liquid crystal layer, which enables production of a liquid crystal display device in which display quality degradation such as image sticking and display unevenness rarely occurs. Moreover, since only short-time exposure to light is required, degradation of parts due to long-time exposure to light can be avoided so that the liquid crystal display device can have a high reliability.

The composition for forming a liquid crystal layer of the present invention is not especially limited by other components as long as it essentially includes such components.

The following will describe preferable embodiments of the composition for forming a liquid crystal layer of the present invention.

In one embodiment, the aforementioned compound is a compound represented by the following chemical formula (1):

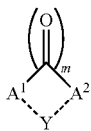
(1)

wherein $A^1$ and $A^2$ are each independently a benzene ring, a biphenyl ring, or a C1-C12 linear or branched alkyl or alkenyl group;

one of $A^1$ and $A^2$ is a benzene ring or a biphenyl ring;

at least one of $A^1$ and $A^2$ includes a -Sp$^1$—P$^1$ group;

a hydrogen atom in $A^1$ and $A^2$ may be replaced by a -Sp$^1$—P$^1$ group, a halogen atom, a —CN group, a —NO$_2$ group, a —NCO group, a —NCS group, a —OCN group, a —SCN group, a —SF$_5$ group, or a C1-C12 linear or branched alkyl, alkenyl, or aralkyl group;

two adjacent hydrogen atoms in $A^1$ or $A^2$ may be substituted with a C1-C12 linear or branched alkylene or alkenylene group to form a ring structure;

a hydrogen atom in the alkyl, alkenyl, alkylene, alkenylene, or aralkyl group of $A^1$ and $A^2$ may be replaced by a -Sp$^1$—P$^1$ group;

a —CH$_2$— group in the alkyl, alkenyl, alkylene, alkenylene, or aralkyl group of $A^1$ and $A^2$ may be substituted with an —O— group, a —S— group, a —NH— group, a —CO— group, a —OCO— group, a —OCO— group, a —O—OCO— group, a —OCH$_2$— group, a —CH$_2$O— group, a —SCH$_2$— group, a —CH$_2$S— group, a —N(CH$_3$)— group, a —N(C$_2$H$_5$)— group, a —N(C$_3$H$_7$)— group, a —N(C$_4$H$_9$)— group, a —CF$_2$O— group, a —OCF$_2$— group, a —CF$_2$S— group, a —SCF$_2$— group, a —N(CF$_3$)— group, a —CH$_2$CH$_2$— group, a —CF$_2$CH$_2$— group, a —CH$_2$CF$_2$— group, a —CF$_2$CF$_2$— group, a —CH=CH— group, a —CF=CF— group, a —C≡C— group, a —CH=CH—OCO— group, or a —OCO—CH=CH— group, provided that oxygen atoms, sulfur atoms and nitrogen atoms are mutually apart;

$P^1$ is a polymerizable group;

$Sp^1$ is a C1-C6 linear, branched, or cyclic alkylene or alkyleneoxy group, or a direct bond;

m is 1 or 2;

a dotted line connecting $A^1$ and Y, and a dotted line connecting $A^2$ and Y show an optional bond between $A^1$ and $A^2$ mediated by Y; and Y is a —CH$_2$— group, a —CH$_2$CH$_2$— group, a —CH=CH— group, a —O— group, a —S— group, a —NH— group, a —N(CH$_3$)— group, a —N(C$_2$H$_5$)— group, a —N(C$_3$H$_7$)— group, a —N(C$_4$H$_9$)— group, a —OCH$_2$— group, a —CH$_2$O— group, a —SCH$_2$— group, a —CH$_2$S— group, or a direct bond.

Examples of the compound represented by the chemical formula (1) in which the m is 1 include the following compounds.

Namely, the compound is any of compounds represented by the following formulae (2-1) to (2-6):

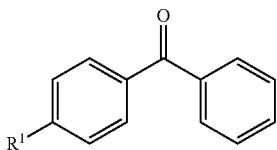
(2-1)

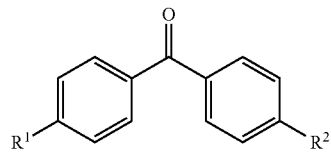
(2-2)

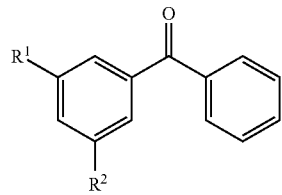
(2-3)

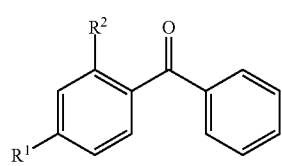
(2-4)

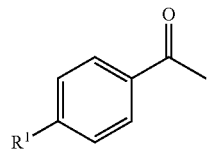
(2-5)

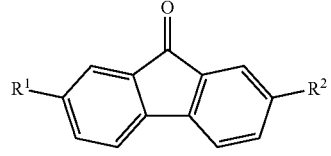
(2-6)

and the compounds represented by the following formulae (2-7) and (2-8):

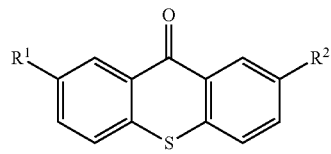
(2-7)

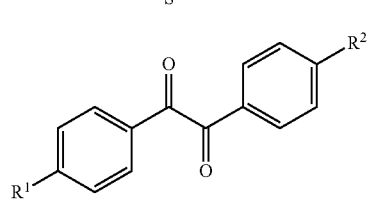
(2-8)

wherein $R^1$ and $R^2$ are each independently a -Sp$^1$—P$^1$ group, a hydrogen atom, a halogen atom, a —CN group, a —NO$_2$ group, a —NCO group, a —NCS group, a —OCN group, a —SCN group, a —SF$_5$ group, or a C1-C12 linear or branched alkyl, aralkyl, or phenyl group;

at least one of $R^1$ and $R^2$ includes a -Sp$^1$—P$^1$ group;

$P^1$ is a polymerizable group;

$Sp^1$ is a C1-C6 linear, branched, or cyclic alkylene or alkyleneoxy group, or a direct bond;

a hydrogen atom in at least one of $R^1$ and $R^2$, when the at least one of $R^1$ and $R^2$ is a C1-C12 linear or branched alkyl, aralkyl, or phenyl group, may be replaced by a fluorine atom, a chlorine atom, or a -Sp$^1$—P$^1$ group; and a —CH$_2$— group in R$^1$ and R$^2$ may be substituted with an —O— group, a —S— group, a —NH— group, a —CO— group, a —OCO— group, a —OCO— group, a —O—OCO— group, a —OCH$_2$— group, a —CH$_2$O— group, a —SCH$_2$— group, a —CH$_2$S— group, a —N(CH$_3$)— group, a —N(C$_2$H$_5$)— group, a —N(C$_3$H$_7$)— group, a —N(C$_4$H$_9$)— group, a —CF$_2$O— group, a —OCF$_2$— group, a —CF$_2$S— group, a —SCF$_2$— group, a —N(CF$_3$)— group, a —CH$_2$CH$_2$— group, a —CF$_2$CH$_2$— group, a —CH$_2$CF$_2$— group, a —CF$_2$CF$_2$— group, a —CH═CH— group, a —CF═CF— group, a —C≡C— group, a —CH═CH—OCO— group, or a —OCO—CH═CH— group, provided that oxygen atoms, sulfur atoms and nitrogen atoms are mutually apart.

Examples of the P$^1$ include an acryloyloxy group, a methacryloyloxy group, a vinyl group, a vinyloxy group, an acryloylamino group, and a methacryloylamino group.

In one embodiment, the composition for forming a liquid crystal layer further includes at least one monomer that contains a monofunctional or polyfunctional polymerizable group having a ring structure. Moreover, examples of the monomer that contains a monofunctional or polyfunctional polymerizable group having a ring structure include a compound represented by the following formula (3):

P$^2$—Sp$^2$-R$^4$-A$^3$-(Z-A$^4$)$_n$R$^3$  (3)

wherein R$^3$ is a —R$^4$-Sp$^2$—P$^2$ group, a hydrogen atom, a halogen atom, a —CN group, a —NO$_2$ group, a —NCO group, a —NCS group, an —OCN group, a —SON group, a —SF$_5$ group, or a C1-C12 linear or branched alkyl group;

P$^2$ is a polymerizable group;

Sp$^2$ is a C1-C6 linear, branched, or cyclic alkylene or alkyleneoxy group, or a direct bond;

a hydrogen atom in R$^3$ may be replaced by a fluorine atom or a chlorine atom;

a —CH$_2$— group in R$^3$ may be substituted with an —O— group, a —S— group, a —NH— group, a —CO— group, a —COO— group, a —OCO— group, a —O—COO— group, a —OCH$_2$— group, a —CH$_2$O— group, a —SCH$_2$— group, a —CH$_2$S— group, a —N(CH$_3$)— group, a —N(C$_2$H$_5$)— group, a —N(C$_3$H$_7$)— group, a —N(C$_4$H$_9$)— group, a —CF$_2$O— group, a —OCF$_2$— group, a —CF$_2$S— group, a —SCF$_2$— group, a —N(CF$_3$)— group, a —CH$_2$CH$_2$— group, a —CF$_2$CH$_2$— group, a —CH$_2$CF$_2$— group, a —CF$_2$CF$_2$— group, a —CH═CH— group, a —CF═CF— group, a —C≡C— group, a —CH═CH—OCO— group, or a —OCO—CH═CH— group, provided that oxygen atoms, and sulfur atoms are mutually apart;

R$^4$ is a —O— group, a —S— group, a —NH— group, a —CO— group, a —COO— group, a —OCO— group, a —O—COO— group, a —OCH$_2$— group, a —CH$_2$O— group, a —SCH$_2$— group, a —CH$_2$S— group, a —N(CH$_3$)— group, a —N(C$_2$H$_5$)— group, a —N(C$_3$H$_7$)— group, a —N(C$_4$H$_9$)— group, a —CF$_2$O— group, a —OCF$_2$— group, a —CF$_2$S— group, a —SCF$_2$— group, a —N(CF$_3$)— group, a —CH$_2$CH$_2$— group, a —CF$_2$CH$_2$— group, a —CH$_2$CF$_2$— group, a —CF$_2$CF$_2$— group, a —CH═CH— group, a —CF═CF— group, a —C≡C— group, a —CH—CH—COO— group, a —OCO—CH═CH— group, or a direct bond;

A$^3$ and A$^4$ are each independently a 1,2-phenylene group, a 1,3-phenylene group, a 1,4-phenylene group, a naphthalene-1,4-diyl group, a naphthalene-1,5-diyl group, a naphthalene-2,6-diyl group, a 1,4-cyclohexylene group, a 1,4-cyclohexenylene group, a 1,4-bicyclo[2.2.2]octylene group, a piperidine-1,4-diyl group, a naphthalene-2,6-diyl group, a decahydronaphthalene-2,6-diyl group, a 1,2,3,4-tetrahydronaphthalene-2,6-diyl group, an indane-1,3-diyl group, an indane-1,5-diyl group, an indane-2,5-diyl group, a phenanthrene-1,6-diyl group, a phenanthrene-1,8-diyl group, a phenanthrene-2,7-diyl group, a phenanthrene-3,6-diyl group, an anthracene-1,5-diyl group, an anthracene-1,8-diyl group, an anthracene-2,6-diyl group, or an anthracene-2,7-diyl group;

—CH$_2$— groups in A$^3$ and A$^4$ may be substituted with —O— groups or —S— groups, provided that they are mutually apart;

a hydrogen atom in A$^3$ and A$^4$ may be replaced by a fluorine atom, a chlorine atom, a —CN group, or a C1-C6 alkyl, alkoxy, alkylcarbonyl, alkoxycarbonyl, or alkylcarbonyloxy group;

Z is a —O— group, a —S— group, a —NH— group, a —CO— group, a —COO— group, a —OCO— group, a —O—COO— group, a —OCH$_2$— group, a —CH$_2$O— group, a —SCH$_2$— group, a —CH$_2$S— group, a —N(CH$_3$)— group, a —N(C$_2$H$_5$)— group, a —N(C$_3$H$_7$)— group, a —N(C$_4$H$_9$)— group, a —CF$_2$O— group, a —OCF$_2$— group, a —CF$_2$S— group, a —SCF$_2$— group, a —N(CF$_3$)— group, a —CH$_2$CH$_2$— group, a —CF$_2$CH$_2$— group, a —CH$_2$CF$_2$— group, a —CF$_2$CF$_2$— group, a —CH═CH— group, a —CF═CF— group, a —C≡C— group, a —CH═CH—OCO— group, a —OCO—CH═CH— group, or a direct bond; and n is 0, 1, or 2.

Examples of the P$^2$ include an acryloyloxy group, a methacryloyloxy group, a vinyl group, a vinyloxy group, an acryloylamino group, and a methacryloylamino group.

In one embodiment of the composition for forming a liquid crystal layer, at least one compound that promotes a hydrogen abstraction reaction is further included. Examples of the compound that promotes a hydrogen abstraction reaction include ethers, amines, thiols, or alcohol each including a C1-C12 alkyl alkenyl, or aryl group.

The present invention also relates to a liquid crystal display device that is favorably produced by using the aforementioned composition for forming a liquid crystal layer.

Namely, another aspect of the present invention is a liquid crystal display device including a pair of substrates, and a liquid crystal layer disposed between the pair of substrates, wherein the liquid crystal layer includes a liquid crystal material, at least one of the pair of substrates includes an alignment film for controlling the alignment of adjacent liquid crystal molecules, and a polymer layer that is formed on the alignment film and controls the alignment of the adjacent liquid crystal molecules, the polymer layer is formed by polymerization of a monomer mixed in the liquid crystal layer, and the monomer is a compound having a structure that generates ketyl radicals when undergoing a hydrogen abstraction reaction caused by exposure to light.

In the liquid crystal display device of the present invention, one of the pair of substrates is used as, for example, an array substrate, and the other substrate is used as a color filter substrate. The array substrate is provided with a plurality of pixel electrodes, and the alignment of the liquid crystals is controlled in each pixel. In the color filter substrate, a plurality of colors of color filters are disposed at positions overlapping the respective pixel electrodes in the array substrate, and colors to be displayed are controlled in each pixel.

In the liquid crystal display device of the present invention, at least one of the pair of substrates is provided with an alignment film for controlling the alignment of adjacent liquid crystal molecules. The alignment film in the present invention may have or have not undergone an alignment treatment.

In the liquid crystal display device of the present invention, at least one of the pair of substrates includes a polymer layer that is formed on the alignment film and controls the alignment of the adjacent liquid crystal molecules. The polymer layer is formed by polymerization of a monomer mixed in the liquid crystal layer. Due to the polymer layer formed, even if the alignment film has not undergone an alignment treatment, the liquid crystal molecules adjacent to the alignment film and the polymer layer can be initially tilted in a certain direction. For example, in the case that the monomers are polymerized, with the liquid crystal molecules aligned at the pretilt angle, to form a polymer layer, the formed polymer layer has a structure to allow the liquid crystal molecules to align in the pretilt angle, regardless of whether the alignment film has undergone an alignment treatment.

The monomer is a compound having a structure that generates ketyl radicals when undergoing a hydrogen abstraction reaction caused by exposure to light. Polymer layers formed of the monomer are produced by short-time polymerization without addition of a polymerization initiator and thus contain no impurities derived from polymerization initiators. Therefore, a residual DC voltage seldom occurs in the liquid crystal layer, and display quality degradation such as image sticking and display unevenness rarely occurs. Moreover, degradation of parts caused by long-time exposure to light is prevented. As a result, a liquid crystal display device having high reliability in the stability of the voltage holding ratio (VHR), or the like is achieved.

The constitution of the liquid crystal display device of the present invention is not especially limited by other constituting elements as long as the liquid crystal display device is formed essentially from such constituting elements.

Preferable configurations of the liquid crystal display device of the present invention include configurations similar to the content described above as preferable configurations of the composition for forming a liquid crystal layer of the present invention. Namely, the following embodiments (a) to (h) may be exemplified: (a) the compound is a compound represented by the chemical formula (1); (b) the m is 1 in the compound represented by the chemical formula (1); (c) the compound is any of the compounds represented by the chemical formulae (2-1) to (2-6); (d) the compound is any of compounds represented by the chemical formulae (2-7) and (2-8); (e) the $P^1$ is an acryloyloxy group, a methacryloyloxy group, a vinyl group, a vinyloxy group, an acryloylamino group, and a methacryloylamino group; (f) the polymer layer is formed by polymerization of at least one monomer that contains a monofunctional or polyfunctional polymerizable group having a ring structure; (g) the monomer that contains a monofunctional or polyfunctional polymerizable group having a ring structure is a compound represented by the chemical formula (3); and (h) the $P^2$ is an acryloyloxy group, a methacryloyloxy group, a vinyl group, a vinyloxy group, an acryloylamino group, or a methacryloylamino group.

In one embodiment, the monomer that contains monofunctional or polyfunctional polymerizable group having a ring structure is any of compounds represented by the following formulae (4-1) to (4-5):

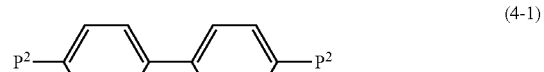

(4-1)

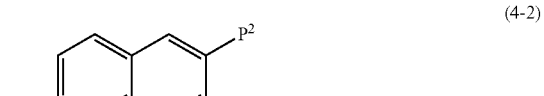

(4-2)

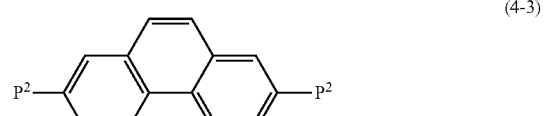

(4-3)

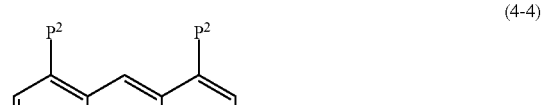

(4-4)

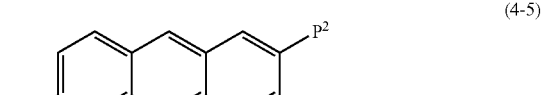

(4-5)

wherein the $P^2$s are each independently a polymerizable group. Examples of the $P^2$ include an acryloyloxy group, a methacryloyloxy group, a vinyl group, a vinyloxy group, an acryloylamino group, and a methacryloylamino group.

The present invention also relates to a method for producing a liquid crystal display device that is favorably produced by using the composition for forming a liquid crystal layer.

Namely, another aspect of the present invention is a method for producing a liquid crystal display device that includes a pair of substrates, and a liquid crystal layer disposed between the pair of substrates. The method includes formation of an alignment film for controlling the alignment of adjacent liquid crystal molecules on at least one of the pair of substrates, and formation of a polymer layer for controlling the alignment of the adjacent liquid crystal molecules on the alignment film. The formation of a polymer layer includes polymerization of a monomer mixed in the liquid crystal layer. The monomer is a compound having a structure that generates ketyl radicals when undergoing a hydrogen abstraction reaction caused by exposure to light.

The features of liquid crystal display devices to be produced by the production method according to the present invention are the same as those of the liquid crystal display device of the present invention.

The monomer is a compound having a structure that generates ketyl radicals when undergoing a hydrogen abstraction reaction caused by exposure to light. In formation of a polymer layer formed of such a monomer, addition of a polymerization initiator is not necessary, and the polymerization proceeds in a short time. Also, no impurities derived from polymerization initiators are generated. Therefore, a residual DC voltage rarely occurs in a liquid crystal layer, which enables production of a liquid crystal display device in which display quality degradation such as image sticking and display unevenness rarely occurs. Moreover, since only short-time exposure to light is required, degradation of parts due to long-time exposure to light can be avoided so that the liquid crystal display device can have a high reliability.

The production method of the liquid crystal display device according to the present invention is not especially limited as long as these steps are included. The production method may include other steps.

Preferable embodiments of the method for producing a liquid crystal display device of the present invention include those similar to the aforementioned preferable embodiments of the composition for forming a liquid crystal layer and the liquid crystal display device of the present invention. Namely, the following embodiments (a) to (h) may be exemplified: (a) the compound is a compound represented by the chemical formula (1); (b) them is 1 in the compound represented by the chemical formula (1); (c) the compound is any of the compounds represented by the chemical formulae (2-1) to (2-6); (d) the compound is any of compounds represented by the chemical formulae (2-7) and (2-8); (e) the $P^1$ is an acryloyloxy group, a methacryloyloxy group, a vinyl group, a vinyloxy group, an acryloylamino group, and a methacryloylamino group; (f) the formation of a polymer layer includes polymerization of at least one monomer that contains a monofunctional or polyfunctional polymerizable group having a ring structure; (g) the monomer that contains a monofunctional or polyfunctional polymerizable group having a ring structure is a compound represented by the chemical formula (3); (h) the $P^2$ is an acryloyloxy group, a methacryloyloxy group, a vinyl group, a vinyloxy group, an acryloylamino group, or a methacryloylamino group; and (i) the monomer that contains a monofunctional or polyfunctional polymerizable group having a ring structure is any of the compounds represented by the chemical formulae (4-1) to (4-5). The following will discuss other preferable embodiments.

In one embodiment of the formation of a polymer layer, a polymer layer is formed while a threshold or more voltage is applied to the liquid crystal layer. When the PSA polymerization step is initiated by light irradiation to the liquid crystal layer to which a threshold or higher voltage is applied, a polymer is formed in accordance with the alignment of liquid crystal molecules under a threshold or higher voltage application. Therefore, the formed PSA layer has a structure capable of functioning as an alignment film that allows the liquid crystal molecules to have an initial pretilt angle even under no voltage application later.

In another embodiment of the formation of a polymer layer, a polymer layer is formed while a threshold or more voltage is not applied to the liquid crystal layer. Even in a condition where a threshold or more voltage is not applied, the alignment control capability of the alignment film can be maintained for a long time, and an effect of reducing occurrence of image sticking and display unevenness can be achieved.

Advantageous Effects of Invention

The present invention enables to provide a liquid crystal display device in which a residual DC voltage rarely occurs in a liquid crystal layer, and display quality degradation such as image sticking and display unevenness rarely occurs. The present invention also enables to provide a liquid crystal display device having high reliability with little degradation of parts thereof.

DESCRIPTION OF EMBODIMENTS

Figure 1:
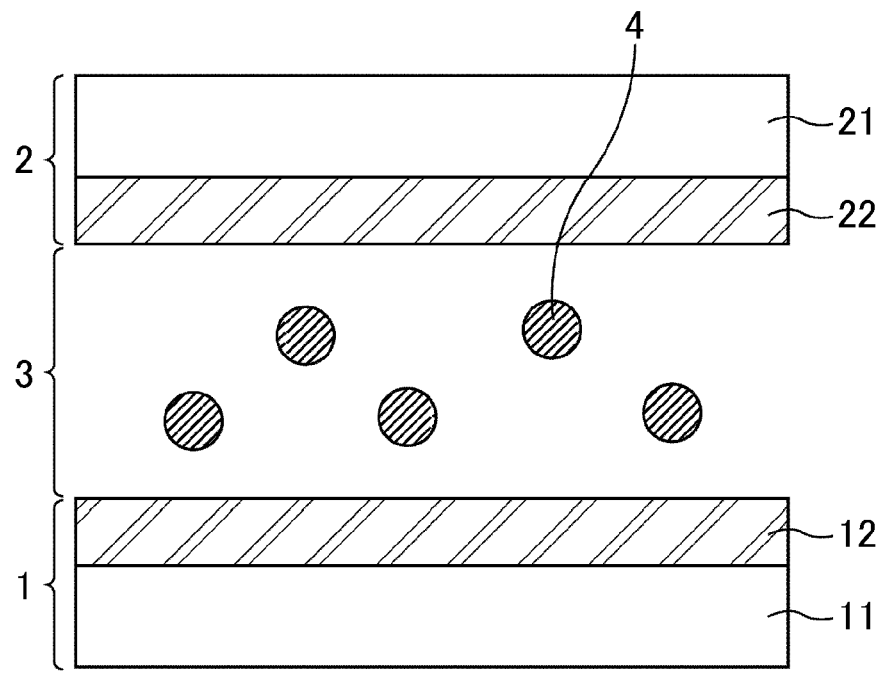
FIG. 1 is a cross-sectional view schematically illustrating a liquid crystal display device according to Embodiment 1 before the PSA polymerization step.

The present invention will be mentioned in more detail referring to the drawings in the following embodiments, but is not limited to these embodiments.

Embodiment 1

Figure 2:
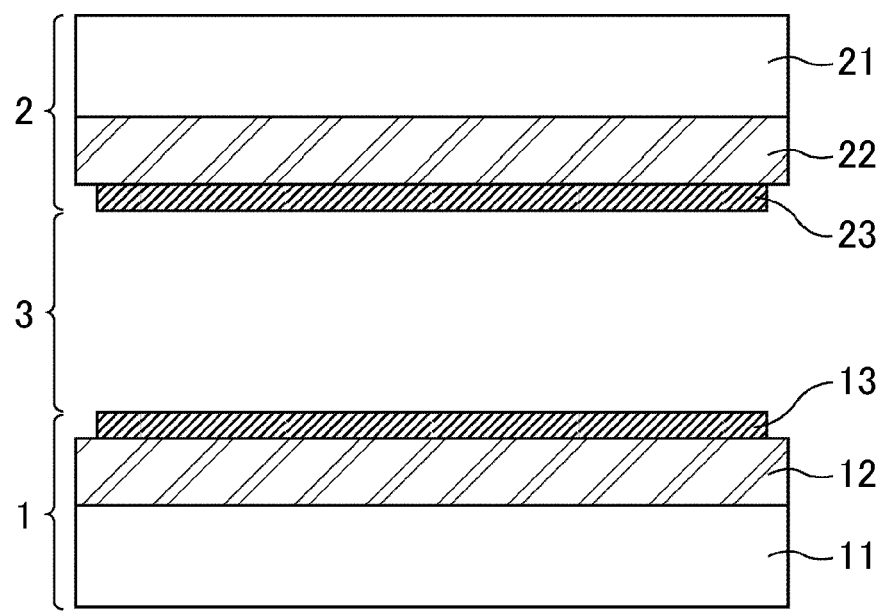
FIG. 2 is a cross-sectional view schematically illustrating a liquid crystal display device according to Embodiment 1 after the PSA polymerization step.

FIG. 1 and FIG. 2 each are a cross sectional view schematically illustrating a liquid crystal display device according to Embodiment 1. FIG. 1 illustrates the liquid crystal display device before the PSA polymerization step, and FIG. 2 illustrates the liquid crystal display device after the PSA polymerization step. As shown in FIG. 1 and FIG. 2, the liquid crystal display device according to Embodiment 1 includes an array substrate 1, a color filter substrate 2, and a liquid crystal layer 3 disposed between a pair of the substrates consisting of the array substrate 1 and the color filter substrate 2. The array substrate 1 includes an insulating transparent substrate made of glass, or the like, and a support substrate 11 that is formed on the transparent substrate and is provided with various wirings, pixel electrodes, a TFT (Thin Film Transistor), or the like. The color filter substrate 2 includes an insulating transparent substrate made of glass, or the like, and a support substrate 21 that is formed on the transparent substrate and is provided with a color filter, black matrix, common electrodes, or the like.

In the array substrate 1, an alignment film 12 is provided on the support substrate 11. In the color filter substrate 2, an alignment film 22 is provided on the support substrate 21. The alignment films 12 and 22 include a polymer material (polyimide) having a main chain that contains an imide structure. For example, if vertical alignment films are used as the alignment films 12 and 22, liquid crystal molecules have a pretilt angle of approximately 90° even without having undergone an alignment treatment. Furthermore, an alignment treatment on the surface of the vertical alignment film allows the liquid crystal molecules to tilt (initially tilt) a certain angle from the tilt angle of approximately 90°. A compound having a longer side chain than common polymers is used as a material for the vertical alignment film.

As shown in FIG. 1, one, or two or more monomer(s) 4 are present in the liquid crystal layer 3 before the PSA polymerization step. Polymerization of the monomer(s) 4 is initiated by the PSA polymerization step so that PSA layers 13 and 23 are formed on the alignment films 12 and 22, respectively.

Specifically, the PSA layers 13 and 23 may be formed by injecting a composition for forming a liquid crystal layer that contains the one, or two or more monomer(s) 4 and liquid crystal materials having a negative dielectric constant anisotropy between the array substrate 1 and the color filter substrate 2 to form the liquid crystal layer, and then exposing the liquid crystal layer 3 to a certain amount of light so that the monomer(s) 4 is/are polymerized. FIG. 2 illustrates an embodiment in which the PSA layers respectively cover the entire surfaces of the alignment films. Practically, the PSA layers each may be formed in a dotted pattern at a plurality of locations, and may have uneven thickness.

The monomers 4 used in Embodiment 1 by themselves absorb light and generate radicals to initiate chain polymerization. Therefore, a polymerization initiator needs not to be added.

In Embodiment 1, for example, the PSA polymerization step is initiated by light irradiation to the liquid crystal layer 3 to which a threshold or higher voltage is applied. As a result, a polymer is formed in accordance with the alignment of the liquid crystal molecules under a threshold or higher voltage application. Therefore, the formed PSA layers have structures capable of functioning as alignment films that allow the liquid crystal molecules to have an initial pretilt angle even under no voltage application later.

In Embodiment 1, in the case where the alignment films 12 and 22 have undergone an alignment treatment, the light irradiation may be performed on the liquid crystal layer 3 to which a threshold or higher voltage is not applied. In the case where the alignment films 12 and 22 by themselves have a feature to allow the liquid crystal molecules to align at a pretilt angle, the PSA layers 13 and 23 formed on the respective alignment films 12 and 22 function as layers to enhance the alignment-stabilizing property of the alignment film. As a result, the alignment control capability is maintained for a long time so that the liquid crystal molecules are controlled to be more uniformly aligned. Thus, temporary changes in the alignment are reduced. Moreover, occurrence of image sticking on display is reduced. In Embodiment 1, the PSA layers 13 and 23 may be formed by firstly subjecting the alignment films 12 and 22 to an alignment treatment and then exposing the liquid crystal layer 3 to light under a threshold or higher voltage application. This setting enables to provide alignment films having better alignment stability.

In Embodiment 1, the alignment of the liquid crystal molecules may be set by line-shaped slits that are provided in a pixel electrode included in the support substrate 11, or in a common electrode included in the support substrate 21. In the case where thin line-shaped slits are formed in the pixel electrode and/or common electrode, liquid crystal molecules have a property of uniformly aligning toward the line-shaped slits when a voltage is applied thereto. Therefore, PSA layers capable of allowing the liquid crystal molecules to have a pretilt angle can be formed when the monomers are polymerized while a threshold or more voltage is applied to the liquid crystal layer 3.

At least one of the monomers 4 to be used in Embodiment 1 is a monomer that generates ketyl radicals when undergoing a hydrogen abstraction reaction caused by exposure to light. The compounds represented by the chemical formula (1) may be used, and the compounds represented by the chemical formulae (2-1) to (2-8) are preferably used as the monomer.

The monomers represented by the chemical formulae (1) and (2-1) to (2-8) each do not require addition of another polymerization initiator when it is mixed with liquid crystal materials. Polymerization can be initiated merely by exposure to light. Moreover, because of no generation of easily electrically chargeable impurities which are supposedly derived from polymerization initiators, occurrence of image sticking can be reduced as compared to the case where other monomer materials are used to form a PSA layer. In Embodiment 1, the composition for forming a liquid crystal layer may include the compound represented by the chemical formula (3), or preferably the compound represented by one of the chemical formulae (4-1) to (4-5) so that an effect of reducing occurrence of image sticking can also be achieved.

Other elements of the liquid crystal display device according to Embodiment 1 will be described in detail below.

In the liquid crystal display device according to Embodiment 1, the array substrate 1, the liquid crystal layer 3, and the color filter substrate 2 are stacked in the sequence set forth from the rear side to the observation side of the liquid crystal display device. A polarizer is mounted at the rear side of the support substrate 11 of the array substrate 1. A polarizer is also mounted at the observation side of the support substrate 21 of the color filter substrate 2. These polarizers each may be further provided with a retardation plate. These polarizers may be circular polarizers.

The liquid crystal display device according to Embodiment 1 may be any one of transmissive type, reflective type, and transmissive-and-reflective type liquid crystal display devices. In the case of transmissive type or transmissive-and-reflective type, the liquid crystal display device according to Embodiment 1 further includes a backlight. The backlight is disposed so that light passes through the array substrate 1, the liquid crystal layer 3, and the color filter substrate 2 in the sequence set forth. In the case of reflective type or transmissive-and-reflective type, the array substrate 1 is provided with a reflector for reflecting external light. Moreover, in the region where at least reflected light is used for display, the polarizer of the color filter substrate 2 needs to be a circular polarizer having a $\lambda/4$ retardation plate.

The liquid crystal display device according to Embodiment 1 may have a color filter on array structure in which the array substrate 1 includes a color filter. Moreover, the liquid crystal display device according to Embodiment 1 may be a monochrome display. In this case, a color filter is not necessary.

The liquid crystal layer 3 is filled with a liquid crystal material which has a property of being aligned in a specific direction upon application of a certain voltage. The alignment of the liquid crystal molecules in the liquid crystal layer 3 is controlled by application of a threshold or higher voltage.

A component analysis of the alignment film, a component analysis of monomers for forming the PSA layer present in the PSA layer, the amount of the monomers for forming the PSA layer included in the liquid crystal layer, the ratio of the monomers for forming the PSA layer in the PSA layer, or the like of the liquid crystal display device according to Embodiment 1 can be determined by disassembling the liquid crystal display device (for example, liquid crystal TV (television), DID (digital information display)), and then performing a chemical analysis based on nuclear magnetic resonance (NMR), fourier transform infrared spectroscopy (FT-IR), mass Spectrometry (MS), or the like.

Example 1

The following will discuss Example 1 in which a liquid crystal cell included in the liquid crystal display device according to Embodiment 1 was actually produced. First, a pair of support substrates were prepared. A polyamic acid solution as a material of a vertical alignment film was applied to the surfaces of the pair of support substrates, followed by pre-baking at 80° C. for five minutes and subsequent post-baking at 200° C. for sixty minutes to produce a polyimide.

Next, an alignment treatment was performed on the alignment film after post-baking. Next, a seal was applied to a single-sided substrate. Then a composition for forming a liquid crystal layer that contained liquid crystal materials having negative dielectric constant anisotropy and a monomer for forming a PSA layer was dropped onto the single-sided substrate. Thereafter, the other substrate was laminated on the composition.

In Example 1, a combination of monomers represented by the chemical formulae (5) and (6) below were used. The compound represented by the chemical formula (5) is a bifunctional methacrylate monomer having a biphenyl structure, and the compound represented by the chemical formula (6) is a bifunctional methacrylate monomer having a benzophenone structure.

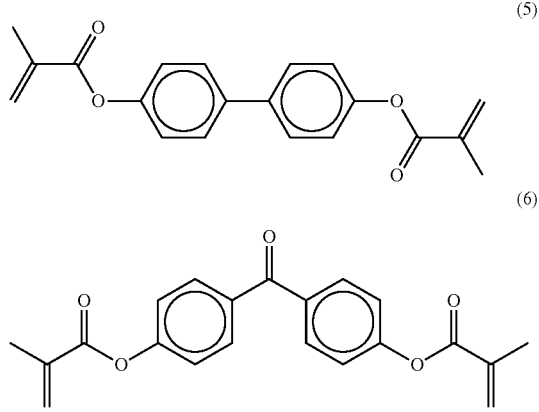

For production of the liquid crystal cell described in Example 1, compounds represented by the above chemical formulae (5) and (6) to be used as monomers for forming a PSA layer were synthesized. Meanwhile, the synthesis method of the compounds is not limited to the method below.

Synthesis Example 1

Synthesis of 4,4-dimethacryloyloxybenzophenone (the chemical formula (6)

An amount of 4.0 g of 4,4'-dihydroxybenzophenone was dissolved in 24 g of THF, and 4.7 g of triethylamine was added thereto. Then, 4.8 g of methacrylic acid chloride was dropwise added to the mixture over 30 minutes, followed by stirring for one hour. To the stirred solution was added 170 g of a 196-HCl aqueous solution, then extracted with 120 g of methylene chloride, and separated and washed with water. Thereafter, methylene chloride was distilled away, and the resultant was purified by silica gel column chromatography (ethyl acetate:hexane=1:5) to thereby give 4.5 g of a target 4,4'-dimethacryloyloxybenzophenone. The reaction path is represented by the following chemical reaction formula (7).

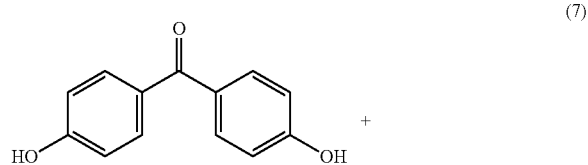

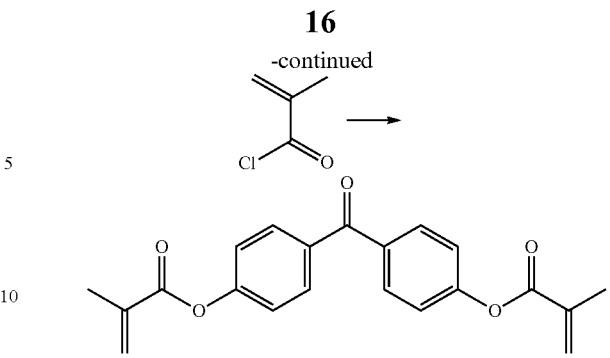

The following samples A to E were prepared in Example 1. In the sample A, the composition for forming liquid crystal layers contains 0.3 wt % of the bifunctional biphenyl monomer represented by the chemical formula (5). In the sample B, the composition for forming liquid crystal layers contains 0.3 wt % of the bifunctional biphenyl monomer represented by the chemical formula (5) and 0.03 wt % of the bifunctional benzophenone monomer represented by the chemical formula (6). In the sample C, the composition for forming liquid crystal layers contains 0.3 wt % of the bifunctional biphenyl monomer represented by the chemical formula (5) and 0.1 wt % of the bifunctional benzophenone monomer represented by the chemical formula (6). In the sample D, the composition for forming liquid crystal layers contains 0.3 wt % of the bifunctional biphenyl monomer represented by the chemical formula (5) and 0.15 wt % of the bifunctional benzophenone monomer represented by the chemical formula (6). In the sample E, the composition for forming a liquid crystal layer contains no monomer.

Next, the liquid crystal layer disposed between a pair of substrates was exposed to black light (ultraviolet lays having a peak wavelength in a range of 300 to 370 nm) under no voltage application to initiate polymerization reaction. Thereby, a liquid crystal cell in which a PSA layer was formed on a vertical alignment film was produced in each example. The time for exposure to ultraviolet light was 30 minutes. The ultraviolet light source used was a FHF-32ELB produced by Toshiba Lighting and Technology Corporation. The FHF-32BLB is an ultraviolet light source that emits light having a wavelength of 310 nm with low intensity and light having a wavelength of not less than 330 nm with high intensity.

Subsequently, each of the produced liquid crystal cells was measured for the residual DC voltage (mV). The following describes the results of the residual DC voltage measurement of respective samples. Table 1 shows the results of the residual DC voltage (mV) measurement in the case of using the samples. In Example 1, the residual DC voltage value was determined by a flicker minimizing method after applying a DC offset voltage of 2 V for 10 hours.

Each of the produced liquid crystal cells was measured for the voltage holding ratio (VHR). The VHR was determined by measuring the charge retention after a lapse of 16.61 ms from application of a pulse voltage of 1 V. The VHR was measured twice in total at an initial stage and at a stage after 1000-hour application while performing light irradiation with backlight of a cold cathode fluorescent lamp (CCFL).

Table 1 shows results of the residual DC voltage (mV) measurement and the VHR (%) measurement of respective samples.

TABLE 1

|  | Composition weight ratio | Residual DC voltage (mV) | VHR (%) after 1000 hrs. |
| --- | --- | --- | --- |
| Sample A | Chemical formula (5) - 0.3 wt % | 160 | 99.2 |
| Sample B | Chemical formula (5) - 0.3 wt % + Chemical formula (6) - 0.03 wt % | −20 | 99.2 |
| Sample C | Chemical formula (5) - 0.3 wt % + Chemical formula (6) - 0.1 wt % | −20 | 99.2 |
| Sample D | Chemical formula (5) - 0.3 wt % + Chemical formula (6) - 0.15 wt % | 20 | 99.2 |
| Sample E | Not added | 250 | 98.4 |

The composition containing 0.3 wt % of the bifunctional biphenyl monomer represented by the chemical formula (5) required exposure to ultraviolet light for a long time (for example, not less than 4 hours). A stable PSA layer was not formed by 30 minutes exposure to ultraviolet light, and the residual DC voltage was 160 mV. The result indicates that, in the case of using only a biphenyl monomer as a monomer, occurrence of image sticking was not reduced.

Use of the composition containing 0.3 wt % of the bifunctional biphenyl monomer represented by the chemical formula (5) and 0.03 wt % of the bifunctional benzophenone monomer represented by the chemical formula (6) reduced the residual DC voltage to as small as −20 mV. Accordingly, an effect of reducing the residual DC voltage was achieved. The result shows that, even in the case of using a bifunctional biphenyl monomer, additional use of a bifunctional benzophenone monomer functioning as a hydrogen abstraction-type initiator allows the polymerization to proceed without any polymerization initiator residue in the liquid crystal layer. Thus, an effect of reducing occurrences of display unevenness and image sticking was achieved. Moreover, since a polymerizable group is contained in the initiator, and an unreacted initiator can be reacted as a monomer, the polymerization proceeds without any polymerization initiator residue in the liquid crystal layer. Thereby, an effect of reducing occurrences of display unevenness and image sticking is proved to be achieved.

Use of the composition containing 0.3 wt % of the bifunctional biphenyl monomer represented by the chemical formula (5) and 0.1 wt % of the bifunctional benzophenone monomer represented by the chemical formula (6) reduced the residual DC voltage to as small as −20 mV. Accordingly, like the sample B, an effect of reducing the residual DC voltage was achieved. Moreover, as indicated by the results of the sample B and the sample C, an effect of reducing the residual DC voltage was achieved by addition of only a small amount of a bifunctional benzophenone monomer.

Furthermore, use of the composition containing 0.3 wt % of the bifunctional biphenyl monomer represented by the chemical formula (5) and 0.15 wt % of the bifunctional benzophenone monomer represented by the chemical formula (6) reduced the residual DC voltage to as small as +20 mV. Accordingly, like the sample B and the sample C, an effect of reducing the residual DC voltage was achieved.

In the case where no monomer was added, and thus no PSA layer was formed, the residual DC voltage was as high as 250 mV. This is supposedly due to easy accumulation of electric charges in an interface of the liquid crystal layer and polyimide side chains of the alignment film.

The samples A to D all maintained the voltage holding ratio (VHR) of not less than 99% without significant reduction. Accordingly, a high reliability was achieved. This is supposedly due to a short-time exposure to ultraviolet light of 30 minutes. On the other hand, the VHR value of the sample E having no PSA layer decreased to 98% level, deteriorating the reliability. The results show that the VHR deteriorates when no PSA layer is formed.

As mentioned earlier, by mixing the bifunctional benzophenone monomer represented by the chemical formula (6) with liquid crystal materials, and using the mixture to form a PSA layer, a liquid crystal display device with a small residual DC voltage can be designed.

The bifunctional benzophenone monomer represented by the chemical formula (6) has an absorbance at a wavelength of around 330 to 370 nm. Thus, the monomer is found to be a monomer that can reduce the time of the polymerization caused by exposure to ultraviolet light.

Example 2

The following will discuss Example 2 in which a liquid crystal cell included in the liquid crystal display device according to Embodiment 1 was actually produced. Samples of liquid crystal cells used in Example 2 were produced in the same manner as in Example 1, except that no alignment treatment was performed on the alignment film, and a PSA layer was formed by exposure to light while a threshold or higher voltage was applied.

The following samples F to J were prepared in Example 2. In the sample F, the composition for forming liquid crystal layers contains 0.3 wt % of the bifunctional biphenyl monomer represented by the chemical formula (5). In the sample G, the composition for forming liquid crystal layers contains 0.3 wt % of the bifunctional biphenyl monomer represented by the chemical formula (5), and 0.03 wt % of the bifunctional benzophenone monomer represented by the chemical formula (6). In the sample H, the composition for forming liquid crystal layers contains 0.3 wt % of the bifunctional biphenyl monomer represented by the chemical formula (5), and 0.1 wt % of the bifunctional benzophenone monomer represented by the chemical formula (6). In the sample I, the composition for forming liquid crystal layers contains 0.3 wt % of the bifunctional biphenyl monomer represented by the chemical formula (5), and 0.15 wt % of the bifunctional benzophenone monomer represented by the chemical formula (6). In the sample J, the composition for forming liquid crystal layers contains no monomer.

Next, the liquid crystal layer disposed between a pair of substrates was exposed to black light (ultraviolet lays having a peak wavelength in a range of 300 to 370 nm) under voltage application at 5 V to initiate polymerization reaction. Thereby, a liquid crystal cell in which a PSA layer was formed on a vertical alignment film was produced in each example. The time for exposure to ultraviolet light was 30 minutes. The ultraviolet light source used was a FHF-32BLB produced by Toshiba Lighting and Technology Corporation.

Subsequently, each of the produced liquid crystal cells was measured for the residual DC voltage (mV). In Example 2, the residual DC voltage value was determined by a flicker minimizing method after applying a DC offset voltage of 2V for 10 hours.

Thereafter, each of the produced liquid crystal cells was measured for the voltage holding ratio (VHR). The VHR was determined by measuring the charge retention after a lapse of 16.61 ms from application of a pulse voltage of 1 V. The VHR was measured twice in total at an initial stage and at a stage after 1000-hour application while performing light irradiation with backlight of a cold cathode fluorescent lamp (CCFL).

Table 2 shows results of the residual DC voltage (mV) measurement and the VHR (%) measurement results of respective samples.

TABLE 2

| | | Residual DC voltage (mV) | VHR (%) after 1000 hrs. |
|---|---|---|---|
| Sample F | Chemical formula (5) - 0.3 wt % | 170 | 99.2 |
| Sample G | Chemical formula (5) - 0.3 wt % + Chemical formula (6) - 0.03 wt % | −10 | 99.2 |
| Sample H | Chemical formula (5) - 0.3 wt % + Chemical formula (6) - 0.1 wt % | −10 | 99.2 |
| Sample I | Chemical formula (5) - 0.3 wt % + Chemical formula (6) - 0.15 wt % | 0 | 99.2 |
| Sample J | Not added | un-measurable | 98.5 |

The composition containing 0.3 wt % of the bifunctional biphenyl monomer represented by the chemical formula (5) required exposure to ultraviolet light for a long time (for example, not less than 4 hours). A stable PSA layer was not formed by 30 minutes exposure to ultraviolet light, and the residual DC voltage was 170 mV. The result shows that occurrence of image sticking is not reduced when a biphenyl monomer alone is used as a monomer.

Use of the composition containing 0.3 wt % of the bifunctional biphenyl monomer represented by the chemical formula (5) and 0.03 wt % of the bifunctional benzophenone monomer represented by the chemical formula (6) reduced the residual DC voltage to as small as −10 mV. Accordingly, an effect of reducing the residual DC voltage was achieved. The result shows that, even in the case of using a bifunctional biphenyl monomer, additional use of a bifunctional benzophenone monomer functioning as a hydrogen abstraction-type initiator allows the polymerization to proceed without any polymerization initiator residue in the liquid crystal layer. Thus, an effect of reducing occurrences of display unevenness and image sticking was achieved. Moreover, since a polymerizable group is contained in the initiator, and an unreacted initiator can be reacted as a monomer, the polymerization proceeds without any polymerization initiator residue in the liquid crystal layer. Thereby, an effect of reducing occurrences of display unevenness and image sticking is proved to be achieved.

Moreover, use of the composition containing 0.3 wt % of the bifunctional biphenyl monomer represented by the chemical formula (5) and 0.1 wt % of the bifunctional benzophenone monomer represented by the chemical formula (6) reduced the residual DC voltage to as small as −10 mV. Accordingly, like the sample G, an effect of reducing occurrence of image sticking was achieved. Moreover, as indicated by the results of the sample G and the sample H, an effect of reducing the residual DC voltage was achieved by addition of only a small amount of a bifunctional benzophenone monomer.

Furthermore, use of the composition containing 0.3 wt % of the bifunctional biphenyl monomer represented by the chemical formula (5) and 0.15 wt % of the bifunctional benzophenone monomer represented by the chemical formula (6) reduced the residual DC voltage to as small as 0 mV. Accordingly, like the sample G and the sample H, an effect of reducing the residual DC voltage was achieved.

In Example 2, the alignment film did not undergo an alignment treatment. In addition, since no monomer was added so that no PSA layer was formed, no polymer layer was formed. Thus, the pre-tilt angle was 90°, therefore the measurement was impossible.

The samples F to I all maintained the voltage holding ratio (VHR) of not less than 99% without significant reduction. Accordingly, a high reliability was achieved. This is supposedly due to a short-time exposure to ultraviolet light of 30 minutes. On the other hand, the VHR value of the sample J having no PSA layer decreased to 98% level, deteriorating the reliability. The results show that a problem relating to reliability occurs when no PSA layer is formed.

As mentioned earlier, by mixing the bifunctional benzophenone monomer represented by the chemical formula (6) with liquid crystal materials, and using the mixture to form a PSA layer, a liquid crystal display device with a small residual DC voltage can be designed.

The bifunctional benzophenone monomer represented by the chemical formula (6) has an absorbance at a wavelength of around 330 to 370 nm. Thus, the monomer is found to be a monomer that can reduce the time of the polymerization caused by exposure to ultraviolet light.

Moreover, as shown by comparison between Example 1 and Example 2, in the case where a bifunctional benzophenone monomer is used as a monomer, generation of residual DC voltage is suppressed so that occurrences of display unevenness and image sticking are reduced, regardless of whether the PSA formation was performed under no voltage application or under application of a voltage.

Example 3

The following will discuss Example 3 in which a liquid crystal cell included in the liquid crystal display device according to Embodiment 1 was actually produced. Samples of liquid crystal cells used in Example 3 were produced in the same manner as in Example 1, except that the polymerizable monomers in the compositions for forming liquid crystal layers had different components and different weight ratios, and the time for exposure to ultraviolet light was 15 minutes.

In Example 3, one or a combination of two of the monomers represented by a chemical formula (8) below and the chemical formula (6) was/were used. The compound represented by the chemical formula (8) below is a bifunctional methacrylate monomer having a phenanthrene structure.

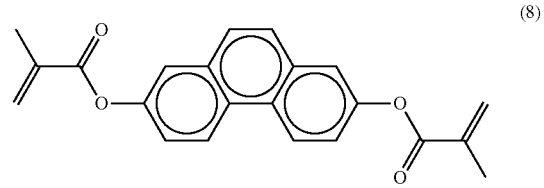

(8)

The following samples K to O were prepared in Example 3. In the sample K, the composition for forming liquid crystal layers contains 0.6 wt % of the bifunctional phenanthrene monomer represented by the chemical formula (8). In the sample L, the composition for forming liquid crystal layers contains 0.6 wt % of the bifunctional phenanthrene monomer represented by the chemical formula (8), and 0.03 wt % of the bifunctional benzophenone monomer represented by the chemical formula (6). In the sample M, the composition for forming liquid crystal layers contains 0.6 wt % of the bifunctional phenanthrene monomer represented by the chemical formula (8), and 0.1 wt % of the bifunctional benzophenone monomer represented by the chemical formula (6). In the sample N, the composition for forming liquid crystal layers contains 0.6 wt % of the bifunctional phenanthrene monomer represented by the chemical formula (8), and 0.15 wt % of the bifunctional benzophenone monomer represented by the chemical formula (6). In the sample O, the composition for forming liquid crystal layers contains no monomer.

Next, the liquid crystal layer disposed between a pair of substrates was exposed to black light (ultraviolet lays having a peak wavelength in a range of 300 to 370 nm) under no voltage application to initiate polymerization reaction. Thereby, a liquid crystal cell in which a PSA layer was formed on a vertical alignment film was produced in each example. The time for exposure to ultraviolet light was 15 minutes. The ultraviolet light source used was a FHF-32BLB produced by Toshiba Lighting and Technology Corporation.

Subsequently, each of the produced liquid crystal cells was measured for the residual DC voltage (mV). In Example 3, the residual DC voltage value was determined by a flicker minimizing method after applying a DC offset voltage of 2 V for 10 hours.

Thereafter, each of the produced liquid crystal cells was measured for the voltage holding ratio (VHR). The VHR was determined by measuring the charge retention after a lapse of 16.61 ms from application of a pulse voltage of 1 V. The VHR was measured twice in total at an initial stage and at a stage after 1000-hour application while performing light irradiation with backlight of a cold cathode fluorescent lamp (CCFL).

Table 3 shows results of the residual DC voltage (mV) measurement and the VHR (%) measurement results of respective samples.

TABLE 3

| | | Residual DC voltage (mV) | VHR (%) after 1000 hrs. |
|---|---|---|---|
| Sample K | Chemical formula (8) - 0.6 wt % | 0 | 99.5 |
| Sample L | Chemical formula (8) - 0.6 wt % + Chemical formula (6) - 0.03 wt % | −20 | 99.5 |
| Sample M | Chemical formula (8) - 0.6 wt % + Chemical formula (6) - 0.1 wt % | −20 | 99.5 |
| Sample N | Chemical formula (8) - 0.6 wt % + Chemical formula (6) - 0.15 wt % | −20 | 99.5 |
| Sample O | Not added | 250 | 98.4 |

In the case of the composition containing 0.6 wt % of the bifunctional phenanthrene monomer represented by the chemical formula (8), the residual DC voltage was 0 mV. The result shows that occurrence of image sticking is reduced even when a phenanthrene monomer alone is used as a monomer.

Use of the composition containing 0.6 wt % of the bifunctional phenanthrene monomer represented by the chemical formula (8) and 0.03 wt % of the bifunctional benzophenone monomer represented by the chemical formula (6) reduced the residual DC voltage to −20 mV, which is smaller by 20 mV than the case where the monomer represented by the chemical formula (6) was not added. Accordingly, an effect of reducing the residual DC voltage was achieved. The result shows that, in the case of not using a bifunctional biphenyl monomer but using a bifunctional phenanthrene monomer, together with a bifunctional benzophenone monomer functioning as a hydrogen abstraction-type initiator, the polymerization can proceed in a shorter time. Accordingly, an effect of reducing an occurrence of image sticking and an effect of suppressing display unevenness are proved to be achieved.

Use of the composition containing 0.6 wt % of the bifunctional phenanthrene monomer represented by the chemical formula (8) and 0.1 wt % of the bifunctional benzophenone monomer represented by the chemical formula (6) reduced the residual DC voltage to −20 mV, which is smaller by 20 mV than the case where the monomer represented by the chemical formula (6) was not added. Accordingly, like the sample L, an effect of reducing the residual DC voltage was achieved. Moreover, as indicated by the results of the sample L and the sample M, an effect of reducing occurrence of image sticking and an effect of suppressing display unevenness were achieved by addition of only a small amount of a bifunctional benzophenone monomer.

Furthermore, use of the composition containing 0.6 wt % of the bifunctional phenanthrene monomer represented by the chemical formula (8) and 0.15 wt % of the bifunctional benzophenone monomer represented by the chemical formula (6) reduced the residual DC voltage to −20 mV, which is smaller by 20 mV than the case where the monomer represented by the chemical formula (6) was not added. Accordingly, like the sample L and the sample M, an effect of reducing occurrence of image sticking and an effect of suppressing display unevenness were achieved.

In the case where no monomer was added, and thus no PSA layer was formed, the residual DC voltage was as high as 250 mV. This is supposedly due to easy accumulation of electric charges in an interface of the liquid crystal layer and polyimide side chains of the alignment film.

The samples K to N all maintained the voltage holding ratio (VHR) of not less than 99% without significant reduction. Accordingly, a high reliability was achieved. This is supposedly due to a short-time exposure to ultraviolet light of 15 minutes. On the other hand, the VHR value of the sample O having no PSA layer decreased to 98% level, deteriorating the reliability. The results show that the VHR deteriorates when no PSA layer is formed.

As mentioned earlier, by mixing the bifunctional benzophenone monomer represented by the chemical formula (6) and additionally the bifunctional phenanthrene monomer represented by the chemical formula (8) with liquid crystal materials, and using the mixture to form a PSA layer, a liquid crystal display device with a small residual DC voltage can be designed in a shorter time.

The bifunctional phenanthrene monomer represented by the chemical formula (8) has an absorbance at a wavelength of around 330 to 370 nm. Thus, the monomer is found to be a monomer that can reduce the time of the polymerization caused by exposure to ultraviolet light.

Example 4

The following will discuss Example 4 in which a liquid crystal cell included in the liquid crystal display device according to Embodiment 1 was actually produced. Samples of liquid crystal cells used in Example 4 were produced in the same manner as in Example 3, except that the alignment film did not undergo an alignment treatment, and the exposure to light was performed under threshold or higher voltage application in the PSA layer formation.

In Example 4, one or a combination of two of the monomers represented by the chemical formulae (8) and (6)

was/were used. The compound represented by the chemical formula (8) is a bifunctional methacrylate monomer having a phenanthrene structure.

The following samples P to T were prepared in Example 4. In the sample P, the composition for forming liquid crystal layers contains 0.6 wt % of the bifunctional phenanthrene monomer represented by the chemical formula (8). In the sample Q, the composition for forming liquid crystal layers contains 0.6 wt % of the bifunctional phenanthrene monomer represented by the chemical formula (8), and 0.03 wt % of the bifunctional benzophenone monomer represented by the chemical formula (6). In the sample R, the composition for forming liquid crystal layers contains 0.6 wt % of the bifunctional phenanthrene monomer represented by the chemical formula (8), and 0.1 wt % of the bifunctional benzophenone monomer represented by the chemical formula (6). In the sample S, the composition for forming liquid crystal layers contains 0.6 wt % of the bifunctional phenanthrene monomer represented by the chemical formula (8), and 0.15 wt % of the bifunctional benzophenone monomer represented by the chemical formula (6). In the sample T, the composition for forming liquid crystal layers contains no monomer.

Next, the liquid crystal layer disposed between a pair of substrates was exposed to black light (ultraviolet lays having a peak wavelength in a range of 300 to 370 nm) under no voltage application to initiate polymerization reaction. Thereby, a liquid crystal cell in which a PSA layer was formed on a vertical alignment film was produced in each example. The time for exposure to ultraviolet light was 15 minutes. The ultraviolet light source used was a FHF-32BLB produced by Toshiba Lighting and Technology Corporation.

Subsequently, each of the produced liquid crystal cells was measured for the residual DC voltage (mV). In Example 4, the residual DC voltage value was determined by a flicker minimizing method after applying a DC offset voltage of 2 V for 10 hours.

Each of the produced liquid crystal cells was measured for the voltage holding ratio (VHR). The VHR was determined by measuring the charge retention after a lapse of 16.61 ms from application of a pulse voltage of 1 V. The VHR was measured twice in total at an initial stage and at a stage after 1000-hour application while performing light irradiation with backlight of a cold cathode fluorescent lamp (CCFL).

Table 4 shows results of the residual DC voltage (mV) measurement and the VHR (%) measurement results of respective samples.

TABLE 4

| | | Residual DC voltage (mV) | VHR (%) after 1000 hrs. |
|---|---|---|---|
| Sample P | Chemical formula (8) - 0.6 wt % | 0 | 99.5 |
| Sample Q | Chemical formula (8) - 0.6 wt % + Chemical formula (6) - 0.03 wt % | −20 | 99.5 |
| Sample R | Chemical formula (8) - 0.6 wt % + Chemical formula (6) - 0.1 wt % | −20 | 99.5 |
| Sample S | Chemical formula (8) - 0.6 wt % + Chemical formula (6) - 0.15 wt % | −20 | 99.5 |
| Sample T | Not added | unmeasurable | 98.5 |

In the case of the composition containing 0.6 wt % of the bifunctional phenanthrene monomer represented by the chemical formula (8), the residual DC voltage was 0 mV. The result shows that occurrence of image sticking is reduced even when a phenanthrene monomer alone is used as a monomer.

Use of the composition containing 0.6 wt % of the bifunctional phenanthrene monomer represented by the chemical formula (8) and 0.03 wt % of the bifunctional benzophenone monomer represented by the chemical formula (6) reduced the residual DC voltage to −20 mV, which is smaller by 20 mV than the case where the monomer represented by the chemical formula (6) was not added. Accordingly, an effect of reducing the residual DC voltage was achieved. The result shows that, in the case of not using a bifunctional biphenyl monomer but using a bifunctional phenanthrene monomer, together with a bifunctional benzophenone monomer functioning as a hydrogen abstraction-type initiator, the polymerization can proceed in a shorter time. Accordingly, an effect of reducing an occurrence of image sticking and an effect of suppressing display unevenness are proved to be achieved.

Use of the composition containing 0.6 wt % of the bifunctional phenanthrene monomer represented by the chemical formula (8) and 0.1 wt % of the bifunctional benzophenone monomer represented by the chemical formula (6) reduced the residual DC voltage to −20 mV, which is smaller by 20 mV than the case where the monomer represented by the chemical formula (6) was not added. Accordingly, like the sample Q, an effect of reducing occurrence of image sticking was achieved. Moreover, as indicated by the results of the sample Q and the sample R, effects of reducing occurrences of display unevenness and image sticking were achieved by addition of only a small amount of a bifunctional benzophenone monomer.

Furthermore, use of the composition containing 0.6 wt % of the bifunctional phenanthrene monomer represented by the chemical formula (8) and 0.15 wt % of the bifunctional benzophenone monomer represented by the chemical formula (6) reduced the residual DC voltage to −20 mV, which is smaller by 20 mV than the case where the monomer represented by the chemical formula (6) was not added. Accordingly, like the sample Q and the sample R, effects of reducing occurrences of display unevenness and image sticking were achieved.

In Example 4, the alignment film did not undergo an alignment treatment. In addition, since no monomer was added so that no PSA layer was formed, no polymer layer was formed. Thus, the pre-tilt angle was 90°, therefore the measurement was impossible.

The samples P to S all maintained the voltage holding ratio (VHR) of not less than 99% without significant reduction. Accordingly, a high reliability was achieved. This is supposedly due to a short-time exposure to ultraviolet light of 15 minutes. On the other hand, the VHR value of the sample T having no PSA layer decreased to 98% level, deteriorating the reliability. The results show that the VHR deteriorates when no PSA layer is formed.

As mentioned earlier, by mixing the bifunctional benzophenone monomer represented by the chemical formula (6) and additionally the bifunctional phenanthrene monomer represented by the chemical formula (8) with liquid crystal materials, and using the mixture to form a PSA layer, a liquid crystal display device with a small residual DC voltage can be designed in a shorter time.

The bifunctional phenanthrene monomer represented by the chemical formula (8) has an absorbance at a wavelength of around 330 to 370 nm. Thus, the monomer is found to be a monomer that can reduce the time of the polymerization caused by exposure to ultraviolet light.

Moreover, as shown by comparison between Example 3 and Example 4, in the case where a bifunctional benzophenone monomer is used as a monomer, generation of residual DC voltage is suppressed so that occurrences of display unevenness and image sticking are reduced, regardless of whether the PSA formation was performed under no voltage application or under application of a voltage.

Example 5

The following will discuss Example 5 in which a liquid crystal cell included in the liquid crystal display device according to Embodiment 1 was actually produced. Samples of liquid crystal cells used in Example 5 were produced in the same manner as in Example 1, except that the polymerizable monomers in the compositions for forming liquid crystal layers had different components and different weight ratios.

In Example 5, a combination of monomers represented by the chemical formula (5) and a chemical formula (9) below were used. The compound represented by the chemical formula (5) is a bifunctional methacrylate monomer having a biphenyl structure. The compound represented by the chemical formula (9) below is a bifunctional methacrylate monomer having a benzyl structure.

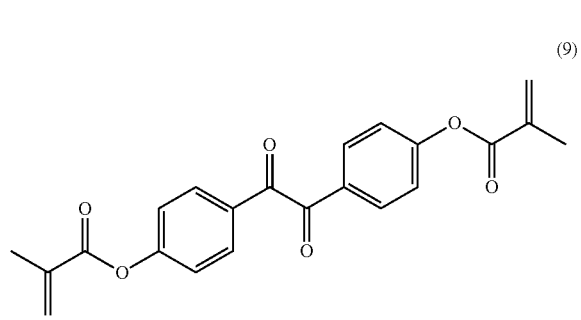 [SMILES: C=C(C)C(=O)Oc1ccc(C(=O)C(=O)c2ccc(OC(=O)C(=C)C)cc2)cc1]

(9)

For production of a liquid crystal cell in Example 5, a compound represented by the above chemical formula (9) to be used as a monomer for forming a PSA layer was synthesized. The synthesis method of the compounds is not limited to the method below.

Synthesis Example 2

Synthesis of 4,4'-dihydroxybenzyl

A commercially available 4,4'-dimethoxybenzyl (5.0 g) was dissolved in 95 mL of acetic acid. The resulting solution was heated to 70° C., and 31.2 g of a 48% HBr aqueous solution was dropwise added thereto. The solution after the addition was stirred at 110° C. for 70 hours. Thereafter, 150 g of water was added thereto for crystallization, and the crystallized mixed solution was filtered. The crystals were washed with 250 g of water and dried so that 4.0 g of a target product was obtained. The reaction path is represented by the following chemical reaction formula (10).

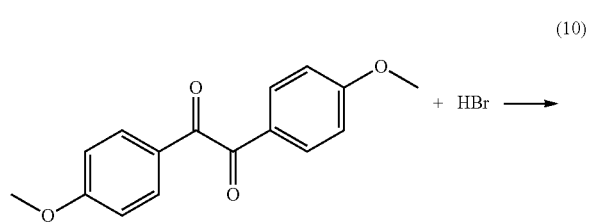

(10)

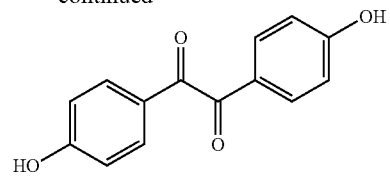

Synthesis Example 3

Synthesis of 4,4'-dimethacryloyloxybenzyl (the above chemical formula (9)

An amount of 5.6 g of a target 4,4'-dimethacryloyloxybenzyl was obtained in the same manner as Synthesis Example 1, except that 4,4'-dihydroxybenzyl was used as a starting material, and purification was performed by silica gel column chromatography (ethyl acetate:hexane=1:4). The reaction path is represented by the following chemical reaction formula (11).

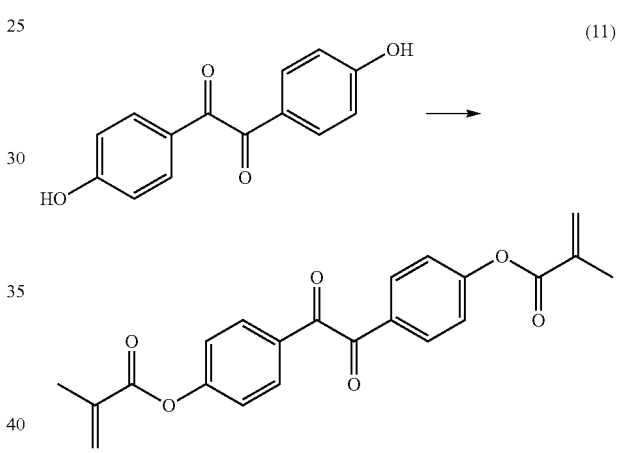

(11)

The following samples U to W were prepared in Example 5. In the sample U, the composition for forming liquid crystal layers contains 0.3 wt % of the bifunctional biphenyl monomer represented by the chemical formula (5) and 0.03 wt % of the bifunctional benzyl monomer represented by the chemical formula (9). In the sample V, the composition for forming liquid crystal layers contains 0.3 wt % of the bifunctional biphenyl monomer represented by the chemical formula (5) and 0.1 wt % of the bifunctional benzyl monomer represented by the chemical formula (9). In the sample W, the composition for forming liquid crystal layers contains 0.3 wt % of the bifunctional biphenyl monomer represented by the chemical formula (5) and 0.15 wt % of the bifunctional benzyl monomer represented by the chemical formula (9).

Next, the liquid crystal layer disposed between a pair of substrates was exposed to black light (ultraviolet lays having a peak wavelength in a range of 300 to 370 nm) under no voltage application to initiate polymerization reaction. Thereby, a liquid crystal cell in which a PSA layer was formed on a vertical alignment film was produced in each example. The time for exposure to ultraviolet light was 30 minutes. The ultraviolet light source used was a FHF-32BLB produced by Toshiba Lighting and Technology Corporation.

Subsequently, each of the produced liquid crystal cells was measured for the residual DC voltage (mV). In Example 5, the residual DC voltage value was determined by a flicker minimizing method after applying a DC offset voltage of 2 V for 10 hours.

Thereafter, each of the produced liquid crystal cells was measured for the voltage holding ratio (VHR). The VHR was determined by measuring the charge retention after a lapse of 16.61 ms from application of a pulse voltage of 1 V. The VHR was measured twice in total at an initial stage and at a stage after 1000-hour application while performing light irradiation with backlight of a cold cathode fluorescent lamp (CCFL).

Table 5 shows results of the residual DC voltage (mV) measurement and the VHR (%) measurement results of respective samples.

TABLE 5

| | | Residual DC voltage (mV) | VHR (%) after 1000 hrs. |
|---|---|---|---|
| Sample U | Chemical formula (5) - 0.3 wt % + Chemical formula (9) - 0.03 wt % | −20 | 99.1 |
| Sample V | Chemical formula (5) - 0.3 wt % + Chemical formula (9) - 0.1 wt % | −10 | 99.1 |
| Sample W | Chemical formula (5) - 0.3 wt % + Chemical formula (9) - 0.15 wt % | 0 | 99.1 |

Use of the composition containing 0.3 wt % of the bifunctional biphenyl monomer represented by the chemical formula (5) and 0.03 wt % of the bifunctional benzyl monomer represented by the chemical formula (9) reduced the residual DC voltage to as small as −20 mV. Accordingly, an effect of reducing the residual DC voltage was achieved. The result shows that, even in the case of using a bifunctional biphenyl monomer, additional use of a bifunctional benzyl monomer functioning as a hydrogen abstraction-type initiator allows the polymerization to proceed without any polymerization initiator residue in the liquid crystal layer. Thus, an effect of reducing occurrences of display unevenness and image sticking was achieved. Moreover, since a polymerizable group is contained in the initiator, and an unreacted initiator can be reacted as a monomer, the polymerization proceeds without any polymerization initiator residue in the liquid crystal layer. Thereby, an effect of reducing occurrences of display unevenness and image sticking is proved to be achieved.

Moreover, use of the composition containing 0.3 wt % of the bifunctional biphenyl monomer represented by the chemical formula (5) and 0.1 wt % of the bifunctional benzyl monomer represented by the chemical formula (9) reduced the residual DC voltage to as small as −10 mV. Accordingly, like the sample U, an effect of reducing the residual DC voltage was achieved. Moreover, as indicated by the results of the sample U and the sample V, an effect of reducing the residual DC voltage was achieved by addition of only a small amount of a bifunctional benzyl monomer.

Furthermore, use of the composition containing 0.3 wt % of the bifunctional biphenyl monomer represented by the chemical formula (5) and 0.15 wt % of the bifunctional benzyl monomer represented by the chemical formula (9) reduced the residual DC voltage to as small as +10 mV. Accordingly, like the sample U and the sample V, an effect of reducing the residual DC voltage was achieved.

The samples U to W all maintained the voltage holding ratio (VHR) of not less than 99% without significant reduction. Accordingly, a high reliability was achieved. This is supposedly due to a short-time exposure to ultraviolet light of 30 minutes.

As mentioned earlier, by mixing the bifunctional benzyl monomer represented by the chemical formula (9) with liquid crystal materials, and using the mixture to form a PSA layer, a liquid crystal display device with a small residual DC voltage can be designed.

The bifunctional benzyl monomer represented by the chemical formula (9) has an absorbance at a wavelength of around 330 to 420 nm. Thus, the monomer is found to be a monomer that can reduce the time of the polymerization caused by exposure to ultraviolet light.

Example 6

The following will discuss Example 6 in which a liquid crystal cell included in the liquid crystal display device according to Embodiment 1 was actually produced. Samples of liquid crystal cells used in Example 6 were produced in the same manner as in Example 5, except that no alignment treatment was performed on the alignment film, and a PSA layer was formed by exposure to light while a threshold or higher voltage was applied.

The following samples X to Z were prepared in Example 5. In the sample X, the composition for forming liquid crystal layers contains 0.3 wt % of the bifunctional biphenyl monomer represented by the chemical formula (5) and 0.03 wt % of the bifunctional benzyl monomer represented by the chemical formula (9). In the sample Y, the composition for forming liquid crystal layers contains 0.3 wt % of the bifunctional biphenyl monomer represented by the chemical formula (5) and 0.1 wt % of the bifunctional benzyl monomer represented by the chemical formula (9). In the sample Z, the composition for forming liquid crystal layers contains 0.3 wt % of the bifunctional biphenyl monomer represented by the chemical formula (5) and 0.15 wt % of the bifunctional benzyl monomer represented by the chemical formula (9).

Next, the liquid crystal layer disposed between a pair of substrates was exposed to black light (ultraviolet lays having a peak wavelength in a range of 300 to 370 nm) under voltage application at 5 V to initiate polymerization reaction. Thereby, a liquid crystal cell in which a PSA layer was formed on a vertical alignment film was produced in each example. The time for exposure to ultraviolet light was 30 minutes. The ultraviolet light source used was a FHF-32BLB produced by Toshiba Lighting and Technology Corporation.

Subsequently, each of the produced liquid crystal cells was measured for the residual DC voltage (mV). In Example 6, the residual DC voltage value was determined by a flicker minimizing method after applying a DC offset voltage of 2 V for 10 hours.

Thereafter, each of the produced liquid crystal cells was measured for the voltage holding ratio (VHR). The VHR was determined by measuring the charge retention after a lapse of 16.61 ms from application of a pulse voltage of 1 V. The VHR was measured twice in total at an initial stage and at a stage after 1000-hour application while performing light irradiation with backlight of a cold cathode fluorescent lamp (CCFL).

Table 6 shows results of the residual DC voltage (mV) measurement and the VHR (%) measurement results of respective samples.

TABLE 6

| | | Residual DC voltage (mV) | VHR (%) after 1000 hrs. |
|---|---|---|---|
| Sample X | Chemical formula (5) - 0.3 wt % + Chemical formula (9) - 0.03 wt % | −10 | 99.1 |
| Sample Y | Chemical formula (5) - 0.3 wt % + Chemical formula (9) - 0.1 wt % | −10 | 99.1 |
| Sample Z | Chemical formula (5) - 0.3 wt % + Chemical formula (9) - 0.15 wt % | 0 | 99.1 |

Use of the composition containing 0.3 wt % of the bifunctional biphenyl monomer represented by the chemical formula (5) and 0.03 wt % of the bifunctional benzyl monomer represented by the chemical formula (9) reduced the residual DC voltage to as small as −10 mV. Accordingly, an effect of reducing the residual DC voltage was achieved. The result shows that, even in the case of using a bifunctional biphenyl monomer, additional use of a bifunctional benzyl monomer functioning as a hydrogen abstraction-type initiator allows the polymerization to proceed without any polymerization initiator residue in the liquid crystal layer. Thus, an effect of reducing occurrences of display unevenness and image sticking was achieved. Moreover, since a polymerizable group is contained in the initiator, and an unreacted initiator can be reacted as a monomer, the polymerization proceeds without any polymerization initiator residue in the liquid crystal layer. Thereby, an effect of reducing occurrences of display unevenness and image sticking is proved to be achieved.

Moreover, use of the composition containing 0.3 wt % of the bifunctional biphenyl monomer represented by the chemical formula (5) and 0.1 wt % of the bifunctional benzyl monomer represented by the chemical formula (9) reduced the residual DC voltage to as small as −10 mV. Accordingly, like the sample X, an effect of reducing the residual DC voltage was achieved. Moreover, as indicated by the results of the sample X and the sample Y, an effect of reducing the residual DC voltage was achieved by addition of only a small amount of a bifunctional benzyl monomer.

Furthermore, use of the composition containing 0.3 wt % of the bifunctional biphenyl monomer represented by the chemical formula (5) and 0.15 wt % of the bifunctional benzyl monomer represented by the chemical formula (9) reduced the residual DC voltage to as small as 0 mV. Accordingly, like the sample X and sample Y, an effect of reducing the residual DC voltage was achieved.

The samples X to Z all maintained the voltage holding ratio (VHR) of not less than 99% without significant reduction. Accordingly, a high reliability was achieved. This is supposedly due to a short-time exposure to ultraviolet light of 30 minutes.

As mentioned earlier, by mixing the bifunctional benzyl monomer represented by the chemical formula (9) with liquid crystal materials, and using the mixture to form a PSA layer, a liquid crystal display device with a small residual DC voltage can be designed.

The bifunctional benzyl monomer represented by the chemical formula (9) has an absorbance at a wavelength of around 330 to 420 nm, and is a monomer that can reduce the time of the polymerization caused by exposure to ultraviolet light.

Moreover, as shown by comparison between Example 5 and Example 6, in the case where a bifunctional benzyl monomer is used as a monomer, generation of residual DC voltage is suppressed so that occurrences of display unevenness and image sticking are reduced, regardless of whether the PSA formation was performed under no voltage application or under application of a voltage.

Example 7

The following will discuss Example 7 in which a liquid crystal cell included in the liquid crystal display device according to Embodiment 1 was actually produced. Samples of liquid crystal cells used in Example 7 were produced in the same manner as in Example 5, except that the polymerizable monomers in the compositions for forming liquid crystal layers had different components and different weight ratios, and the time for exposure to ultraviolet light was 15 minutes.

In Example 7, a combination of monomers represented by the chemical formula (8) and the chemical formula (9) were used. The compound represented by the chemical formula (8) is a bifunctional methacrylate monomer having a phenanthrene structure. The compound represented by the chemical formula (9) is a bifunctional methacrylate monomer having a benzyl structure.

The following samples a to c were prepared in Example 7. In the sample a, the composition for forming liquid crystal layers contains 0.6 wt % of the bifunctional phenanthrene monomer represented by the chemical formula (8) and 0.03 wt % of the bifunctional benzyl monomer represented by the chemical formula (9). In the sample b, the composition for forming liquid crystal layers contains 0.6 wt % of the bifunctional phenanthrene monomer represented by the chemical formula (8) and 0.1 wt % of the bifunctional benzyl monomer represented by the chemical formula (9). In the sample c, the composition for forming liquid crystal layers contains 0.6 wt % of the bifunctional phenanthrene monomer represented by the chemical formula (8) and 0.15 wt % of the bifunctional benzyl monomer represented by the chemical formula (9).

Next, the liquid crystal layer disposed between a pair of substrates was exposed to black light (ultraviolet lays having a peak wavelength in a range of 300 to 370 nm) under no voltage application to initiate polymerization reaction. Thereby, a liquid crystal cell in which a PSA layer was formed on a vertical alignment film was produced in each example. The time for exposure to ultraviolet light was 15 minutes. The ultraviolet light source used was a FHF-32BLB produced by Toshiba Lighting and Technology Corporation.

Subsequently, each of the produced liquid crystal cells was measured for the residual DC voltage (mV). In Example 7, the residual DC voltage value was determined by a flicker minimizing method after applying a DC offset voltage of 2 V for 10 hours.

Thereafter, each of the produced liquid crystal cells was measured for the voltage holding ratio (VHR). The VHR was determined by measuring the charge retention after a lapse of 16.61 ms from application of a pulse voltage of 1 V. The VHR was measured twice in total at an initial stage and at a stage after 1000-hour application while performing light irradiation with backlight of a cold cathode fluorescent lamp (CCFL).

Table 7 shows results of the residual DC voltage (mV) measurement and the VHR (%) measurement results of respective samples.

TABLE 7

| | | Residual DC voltage (mV) | VHR (%) after 1000 hrs. |
|---|---|---|---|
| Sample a | Chemical formula (8) - 0.6 wt % + Chemical formula (9) - 0.03 wt % | −10 | 99.4 |
| Sample b | Chemical formula (8) - 0.6 wt % + Chemical formula (9) - 0.1 wt % | −10 | 99.4 |
| Sample c | Chemical formula (8) - 0.6 wt % + Chemical formula (9) - 0.15 wt % | 0 | 99.4 |

Use of the composition containing 0.6 wt % of the bifunctional phenanthrene monomer represented by the chemical formula (8) and 0.03 wt % of the bifunctional benzyl monomer represented by the chemical formula (9) reduced the residual DC voltage to −10 mV. Accordingly, an effect of reducing the residual DC voltage was achieved. The result shows that, in the case of not using a bifunctional biphenyl monomer but using a bifunctional phenanthrene monomer, together with a bifunctional benzyl monomer functioning as a hydrogen abstraction-type initiator, the polymerization can proceed in a shorter time. Accordingly, an effect of reducing an occurrence of image sticking and an effect of suppressing display unevenness are proved to be achieved.

Moreover, use of the composition containing 0.6 wt % of the bifunctional phenanthrene monomer represented by the chemical formula (8) and 0.1 wt % of the bifunctional benzyl monomer represented by the chemical formula (9) reduced the residual DC voltage to as small as −10 mV. Accordingly, like the sample a, an effect of reducing the residual DC voltage was achieved. Moreover, as indicated by the results of the sample a and the sample b, an effect of reducing the residual DC voltage was achieved by addition of only a small amount of a bifunctional benzyl monomer.

Furthermore, use of the composition containing 0.6 wt % of the bifunctional phenanthrene monomer represented by the chemical formula (8) and 0.15 wt % of the bifunctional benzyl monomer represented by the chemical formula (9) reduced the residual DC voltage to 0 mV. Accordingly, like the sample a and the sample b, an effect of reducing the residual DC voltage was achieved.

The samples a to c all maintained the voltage holding ratio (VHR) of not less than 99% without significant reduction. Accordingly, a high reliability was achieved. This is supposedly due to a short-time exposure to ultraviolet light of 15 minutes.

As mentioned earlier, by mixing the bifunctional benzyl monomer represented by the chemical formula (9) and additionally the bifunctional phenanthrene monomer represented by the chemical formula (8) with liquid crystal materials, and using the mixture to form a PSA layer, a liquid crystal display device with a small residual DC voltage can be designed in a shorter time.

Example 8

The following will discuss Example 8 in which a liquid crystal cell included in the liquid crystal display device according to Embodiment 1 was actually produced. Samples of liquid crystal cells used in Example 8 were produced in the same manner as in Example 7, except that no alignment treatment was performed on the alignment film, and a PSA layer was formed by exposure to light while a threshold or higher voltage was applied.

The following samples d to f were prepared in Example 8. In the sample d, the composition for forming liquid crystal layers contains 0.6 wt % of the bifunctional phenanthrene monomer represented by the chemical formula (8) and 0.03 wt % of the bifunctional benzyl monomer represented by the chemical formula (9). In the sample e, the composition for forming liquid crystal layers contains 0.6 wt % of the bifunctional phenanthrene monomer represented by the chemical formula (8) and 0.1 wt % of the bifunctional benzyl monomer represented by the chemical formula (9). In the sample f, the composition for forming liquid crystal layers contains 0.6 wt % of the bifunctional phenanthrene monomer represented by the chemical formula (8) and 0.15 wt % of the bifunctional benzyl monomer represented by the chemical formula (9).

Next, the liquid crystal layer disposed between a pair of substrates was exposed to black light (ultraviolet lays having a peak wavelength in a range of 300 to 370 nm) under no voltage application to initiate polymerization reaction. Thereby, a liquid crystal cell in which a PSA layer was formed on a vertical alignment film was produced in each example. The time for exposure to ultraviolet light was 15 minutes. The ultraviolet light source used was a FHF-32BLE produced by Toshiba Lighting and Technology Corporation.

Subsequently, each of the produced liquid crystal cells was measured for the residual DC voltage (mV). In Example 8, the residual DC voltage value was determined by a flicker minimizing method after applying a DC offset voltage of 2 V for 10 hours.

Thereafter, each of the produced liquid crystal cells was measured for the voltage holding ratio (VHR). The VHR was determined by measuring the charge retention after a lapse of 16.61 ms from application of a pulse voltage of 1 V. The VHR was measured twice in total at an initial stage and at a stage after 1000-hour application while performing light irradiation with backlight of a cold cathode fluorescent lamp (CCFL).

Table 8 shows results of the residual DC voltage (mV) measurement and the VHR (%) measurement results of respective samples.

TABLE 8

| | | Residual DC voltage (mV) | VHR (%) after 1000 hrs. |
|---|---|---|---|
| Sample d | Chemical formula (8) - 0.6 wt % + Chemical formula (9) - 0.03 wt % | −10 | 99.4 |
| Sample e | Chemical formula (8) - 0.6 wt % + Chemical formula (9) - 0.1 wt % | −10 | 99.4 |
| Sample f | Chemical formula (8) - 0.6 wt % + Chemical formula (9) - 0.15 wt % | −10 | 99.4 |

Use of the composition containing 0.6 wt % of the bifunctional phenanthrene monomer represented by the chemical formula (8) and 0.03 wt % of the bifunctional benzyl monomer represented by the chemical formula (9) reduced the residual DC voltage to as small as −10 mV. Accordingly, an effect of reducing the residual DC voltage was achieved. The result shows that, in the case of not using a bifunctional biphenyl monomer but using a bifunctional phenanthrene monomer, together with a bifunctional benzyl monomer functioning as a hydrogen abstraction-type initiator, the polymerization reaction can proceed in a shorter time. Accordingly, an effect of reducing an occurrence of image sticking and an effect of suppressing display unevenness are proved to be achieved.

Moreover, use of the composition containing 0.6 wt % of the bifunctional phenanthrene monomer represented by the chemical formula (8) and 0.1 wt % of the bifunctional benzyl monomer represented by the chemical formula (9) reduced the residual DC voltage to as small as −10 mV. Accordingly, like the sample d, an effect of reducing the residual DC voltage was achieved. Moreover, as indicated by the results of the sample d and the sample e, an effect of reducing the residual DC voltage was achieved by addition of only a small amount of a bifunctional benzyl monomer.

Furthermore, use of the composition containing 0.6 wt % of the bifunctional phenanthrene monomer represented by the chemical formula (8) and 0.1 wt % of the bifunctional benzyl monomer represented by the chemical formula (9) reduced the residual DC voltage to as small as −10 mV. Accordingly, like the sample d and the sample e, an effect of reducing the residual DC voltage was achieved.

The samples d to f all maintained the voltage holding ratio (VHR) of not less than 99% without significant reduction. Accordingly, a high reliability was achieved. This is supposedly due to a short-time exposure to ultraviolet light of 15 minutes.

As mentioned earlier, by mixing the bifunctional benzyl monomer represented by the chemical formula (9) and additionally the bifunctional phenanthrene monomer represented by the chemical formula (8) with liquid crystal materials, and using the mixture to form a PSA layer, a liquid crystal display device with a small residual DC voltage can be designed in a shorter time.

The bifunctional benzyl monomer represented by the chemical formula (9) has an absorbance at a wavelength of around 330 to 420 nm. Thus, the monomer is found to be a monomer that can reduce the time of the polymerization caused by exposure to ultraviolet light.

Moreover, as shown by comparison between Example 7 and Example 8, in the case where a bifunctional benzyl monomer is used as a monomer, generation of residual DC voltage is suppressed so that occurrences of display unevenness and image sticking are reduced, regardless of whether the PSA formation was performed under no voltage application or under application of a voltage.

The present application claims priority to Patent Application No. 2010-200147 filed in Japan on Sep. 7, 2010 under the Paris Convention and provisions of national law in a designated State, the entire contents of which are hereby incorporated by reference.

REFERENCE SIGNS LIST

1: Array substrate
2: Color filter substrate
3: Liquid crystal layer
4: Monomer
11, 21: Support substrate
12, 22: Alignment film
13, 23: PSA layer (polymer layer)

The invention claimed is:
1. A composition for forming a liquid crystal layer comprising:
a liquid crystal material; and
a first compound,
the first compound having a structure that generates ketyl radicals when undergoing a hydrogen abstraction reaction caused by exposure to light,
wherein the first compound is represented by the following chemical formula (1):

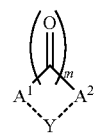

(1)

wherein $A^1$ and $A^2$ are each independently a benzene ring, a biphenyl ring, or a C1-C12 linear or branched alkyl or alkenyl group;
one of $A^1$ and $A^2$ is a benzene ring or a biphenyl ring;
at least one of $A^1$ and $A^2$ includes a -$Sp^1$—$P^1$ group;
a hydrogen atom in $A^1$ and $A^2$ may be replaced by a -$Sp^1$—$P^1$ group, a halogen atom, a —CN group, a —$NO_2$ group, a —NCO group, a —NCS group, a —OCN group, a —SCN group, a —$SF_5$ group, or a C1-C12 linear or branched alkyl, alkenyl, or aralkyl group;
two adjacent hydrogen atoms in $A^1$ or $A^2$ may be substituted with a C1-C12 linear or branched alkylene or alkenylene group to form a ring structure;
a hydrogen atom in the alkyl, alkenyl, alkylene, alkenylene, or aralkyl group of $A^1$ and $A^2$ may be replaced by a -$Sp^1$—$P^1$ group;
a —$CH_2$— group in the alkyl, alkenyl, alkylene, alkenylene, or aralkyl group of $A^1$ and $A^2$ may be substituted with an —O— group, a —S— group, a —NH— group, a —CO— group, a —COO— group, a —OCO— group, a —O—COO— group, a —$OCH_2$— group, a —$CH_2O$— group, a —$SCH_2$— group, a —$CH_2S$— group, —$N(CH_3)$— group, a —$N(C_2H_5)$— group, a —$N(C_3H_7)$— group, a —$N(C_4H_9)$— group, a —$CF_2O$— group, a —$OCF_2$— group, a —$CF_2S$— group, a —$SCF_2$— group, a —$N(CF_3)$— group, a —$CH_2CH_2$— group, a —$CF_2CH_2$— group, a —$CH_2CF_2$— group, a —$CF_2CF_2$— group, a —CH=CH— group, a —CF=CF— group, a —C≡C— group, a —CH=CH—COO— group, or a —OCO—CH=CH— group, provided that oxygen atoms, sulfur atoms and nitrogen atoms are mutually apart;
$P^1$ is a polymerizable group;
$Sp^1$ is a C1-C6 linear, branched, or cyclic alkylene or alkyleneoxy group, or a direct bond;
m is 1 or 2;
a dotted line connecting $A^1$ and Y, and a dotted line connecting $A^2$ and Y show an optional bond between $A^1$ and $A^2$ mediated by Y;
Y is a —$CH_2$— group, a —$CH_2CH_2$— group, a —CH=CH— group, a —O— group, a —S— group, a —NH— group, a —$N(CH_3)$— group, a —$N(C_2H_5)$— group, a —$N(C_3H_7)$— group, a —$N(C_4H_9)$— group, a —$OCH_2$— group, a —$CH_2O$— group, a —$SCH_2$— group, a —$CH_2S$— group, or a direct bond;
the composition further comprising a second compound that contains a monofunctional or polyfunctional polymerizable group having a ring structure;
wherein the second compound that contains a monofunctional or polyfunctional polymerizable group having a ring structure, is represented by the following formula (3):

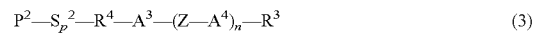

(3)

wherein $R^3$ is a —$R^4$—$Sp^2$—$P^2$ group, a hydrogen atom, a halogen atom, a —CN group, a —$NO_2$ group, a —NCO group, a —NCS group, an —OCN group, a —SCN group, a —SF$_5$ group, or a C1-C12 linear or branched alkyl group;

P$^2$ is a polymerizable group;

Sp$^2$ is a C1-C6 linear, branched, or cyclic alkylene or alkyleneoxy group, or a direct bond;

a hydrogen atom in R$^3$ may be replaced by a fluorine atom or a chlorine atom;

a —CH$_2$— group in R$^3$ may be substituted with an —O— group, a —S— group, a —NH— group, a —CO— group, a —COO— group, a —OCO— group, a —O—COO— group, a —OCH$_2$— group, a —CH$_2$O— group, a —SCH$_2$— group, a —CH$_2$S— group, a —N(CH$_3$)— group, a —N(C$_2$H$_5$)— group, a —N(C$_3$H$_7$)— group, a —N(C$_4$H$_9$)— group, a —CF$_2$O— group, a —OCF$_2$— group, a —CF$_2$S— group, a —SCF$_2$— group, a —N(CF$_3$)— group, a —CH$_2$CH$_2$— group, a —CF$_2$CH$_2$— group, a —CH$_2$CF$_2$— group, a —CF$_2$CF$_2$— group, a —CH=CH— group, a —CF=CF— group, a —C≡C— group, a —CH=CH—COO— group, or a —OCO—CH=CH— group, provided that oxygen atoms, and sulfur atoms are mutually apart;

R$^4$ is a —O— group, a —S— group, a —NH— group, a —CO— group, a —COO— group, a —OCO— group, a —O—COO— group, a —OCH$_2$— group, a —CH$_2$O— group, a —SCH$_2$— group, a —CH$_2$S— group, a —N(CH$_3$)— group, a —N(C$_2$H$_5$)— group, a —N(C$_3$H$_7$)— group, a —N(C$_4$H$_9$)— group, a —CF$_2$O— group, a —OCF$_2$— group, a —CF$_2$S— group, a —SCF$_2$ group, a —N(CF$_3$)— group, a —CH$_2$CH$_2$— group, a —CF$_2$CH$_2$— group, a —CH$_2$CF$_2$— group, a —CF$_2$CF$_2$— group, a —CH=CH— group, a —CF=CF— group, a —C≡C— group, a —CH=CH—COO— group, a —OCO—CH=CH— group, or a direct bond;

A$^3$ and A$^4$ are each independently a 1,2-phenylene group, a 1,3-phenylene group, a 1,4-phenylene group, a naphthalene-1,4-diyl group, a naphthalene-1,5-diyl group, a naphthalene-2,6-diyl group, a 1,4-cyclohexylene group, a 1,4-cyclohexenylene group, a 1,4-bicyclo[2.2.2]octylene group, a piperidine-1,4-diyl group, a naphthalene-2,6-diyl group, a decahydronaphthalene-2,6-diyl group, a 1,2,3,4-tetrahydronaphthalene-2,6-diyl group, an indane-1,3-diyl group, an indane-1,5-diyl group, an indane-2,5-diyl group, a phenanthrene-1,6-diyl group, a phenanthrene-1,8-diyl group, a phenanthrene-2,7-diyl group, a phenanthrene-3,6-diyl group, an anthracene-1,5-diyl group, an anthracene-1,8-diyl group, an anthracene-2,6-diyl group, or an anthracene-2,7-diyl group;

—CH$_2$— groups in A$^3$ and A$^4$ may be substituted with —O— groups or —S— groups, provided that they are mutually apart;

a hydrogen atom in A$^3$ and A$^4$ may be replaced by a fluorine atom, a chlorine atom, a —CN group, or a C1-C6 alkyl, alkoxy, alkylcarbonyl, alkoxycarbonyl, or alkylcarbonyloxy group;

Z is a —O— group, a —S— group, a —NH— group, a —CO— group, a —COO— group, a —OCO— group, a —O—COO— group, a —OCH$_2$— group, a —CH$_2$O— group, a —SCH$_2$— group, a —CH$_2$S— group, a —N(CH$_3$)— group, a —N(C$_2$H$_5$)— group, a —N(C$_3$H$_7$)— group, a —N(C$^4$H$_9$)— group, a —CF$_2$O— group, a —OCF$_2$— group, a —CF$_2$S— group, a —SCF$_2$— group, a —N(CF$_3$)— group, a —CH$_2$CH$_2$— group, a —CF$_2$CH$_2$— group, a —CH$_2$CF$_2$— group, a —CF$_2$CF$_2$— group, a —CH=CH— group, a —CF=CF— group, a —C≡C— group, a —CH=CH—COO— group, a —OCO—CH=CH— group, or a direct bond; and n is 0, 1, or 2.

2. The composition for forming a liquid crystal layer according to claim 1, wherein the m is 1.

3. The composition for forming a liquid crystal layer according to claim 2, wherein the first compound has any of structure represented by the following formulae (2-1) to (2-6):

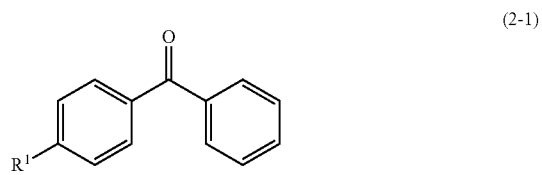

(2-1)

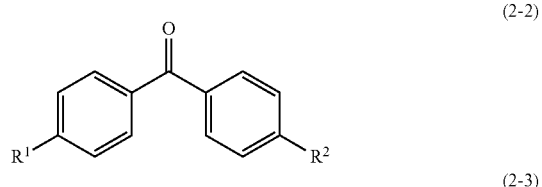

(2-2)

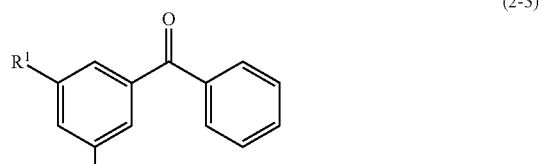

(2-3)

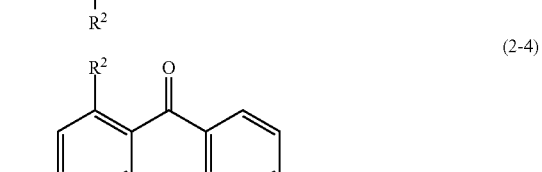

(2-4)

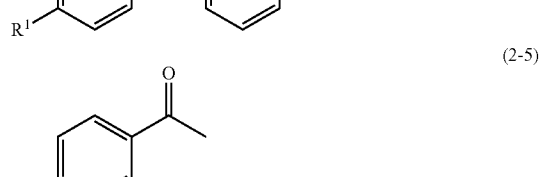

(2-5)

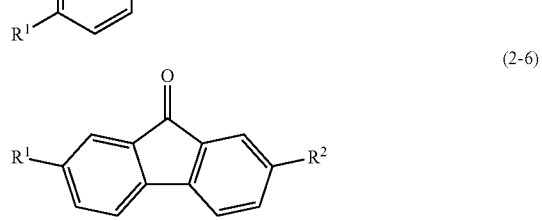

(2-6)

wherein R$^1$ and R$^2$ are each independently a -Sp$^1$—P$^1$ group, a hydrogen atom, a halogen atom, a —CN group, a —NO$_2$ group, a —NCO group, a —NCS group, a —OCN group, a —SCN group, a —SF$_5$ group, or a C1-C12 linear or branched alkyl, aralkyl, or phenyl group;

at least one of R$^1$ and R$^2$ includes a -Sp$^1$—P$^1$ group;

P$^1$ is a polymerizable group;

Sp$^1$ is a C1-C6 linear, branched, or cyclic alkylene or alkyleneoxy group, or a direct bond;

a hydrogen atom in at least one of R$^1$ and R$^2$, when the at least one of R$^1$ and R$^2$ is a C1-C12 linear or branched alkyl, aralkyl, or phenyl group, may be replaced by a fluorine atom, a chlorine atom, or a -Sp$^1$—P$^1$ group; and a —CH₂— group in R¹ and R² may be substituted with an —O— group, a —S— group, a —NH— group, a —CO— group, a —COO— group, a —OCO— group, a —O—COO— group, a —OCH₂— group, a —CH₂O— group, a —SCH₂— group, a —CH₂S— group, a —N(CH₃)— group, a —N(C₂H₅)— group, a —N(C₃H₇)— group, a —N(C₄H₉)— group, a —CF₂O— group, a —OCF₂— group, a —CF₂S— group, a —SCF₂— group, a —N(CF₃)— group, a —CH₂CH₂— group, a —CF₂CH₂— group, a —CH₂CF₂— group, a —CF₂CF₂— group, a —CH=CH— group, a —CF=CF— group, a —C≡C— group, a —CH=CH—COO— group, or a —OCO—CH=CH— group, provided that oxygen atoms, sulfur atoms and nitrogen atoms are mutually apart.

4. The composition for forming a liquid crystal layer according to claim 1, wherein the first compound has any of structures represented by the following formulae (2-7) and (2-8):

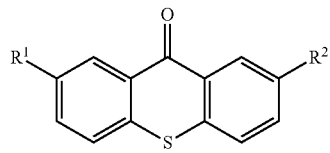
(2-7)

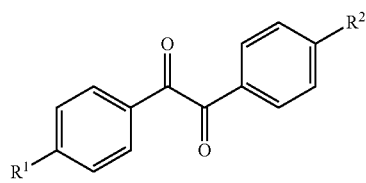
(2-8)

wherein R¹ and R² are each independently a -Sp¹—P¹ group, a hydrogen atom, a halogen atom, a —CN group, a —NO₂ group, a —NCO group, a —NCS group, a —OCN group, a —SCN group, a —SF₅ group, or a C1-C12 linear or branched alkyl, aralkyl, or phenyl group;
at least one of R¹ and R² includes a -Sp¹—P¹ group;
P¹ is a polymerizable group;
Sp¹ is a C1-C6 linear, branched, or cyclic alkylene or alkyleneoxy group, or a direct bond;
a hydrogen atom in at least one of R¹ and R², when the at least one of R¹ and R² is a C1-C12 linear or branched alkyl, aralkyl, or phenyl group, may be replaced by a fluorine atom, a chlorine atom, or a -Sp¹—P¹ group; and
a —CH₂— group in R¹ and R² may be substituted with an —O— group, a —S— group, a —NH— group, a —CO— group, a —COO— group, a —OCO— group, a —O—COO— group, a —OCH₂— group, a —CH₂O— group, a —SCH₂— group, a —CH₂S— group, a —N(CH₃)— group, a —N(C₂H₅)— group, a —N(C₃H₇)— group, a —N(C₄H₉)— group, a —CF₂O— group, a —OCF₂— group, a —CF₂S— group, a —SCF₂— group, a —N(CF₃)— group, a —CH₂CH₂— group, a —CF₂CH₂— group, a —CH₂CF₂— group, a —CF₂CF₂— group, a —CH=CH— group, a —CF=CF— group, a —C≡C— group, a —CH=CH—COO— group, or a —OCO—CH=CH— group, provided that oxygen atoms, sulfur atoms and nitrogen atoms are mutually apart.

5. The composition for forming a liquid crystal layer according to claim 1, wherein the P¹ is an acryloyloxy group, a methacryloyloxy group, a vinyl group, a vinyloxy group, an acryloylamino group, or a methacryloylamino group.

6. The composition for forming a liquid crystal layer according to claim 1,
wherein the P² is an acryloyloxy group, a methacryloyloxy group, a vinyl group, a vinyloxy group, an acryloylamino group, or a methacryloylamino group.

7. The composition for forming a liquid crystal layer according to claim 1,
wherein the first compound is any of compounds represented by the following formulae (2-1), (2-3) to (2-6), (2-7) and (2-8):

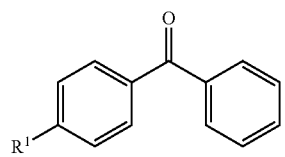
(2-1)

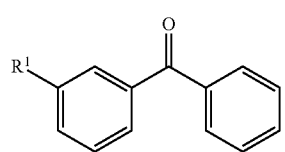
(2-3)

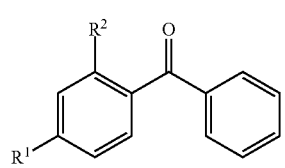
(2-4)

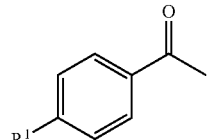
(2-5)

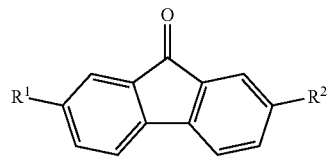
(2-6)

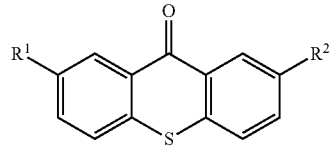
(2-7)

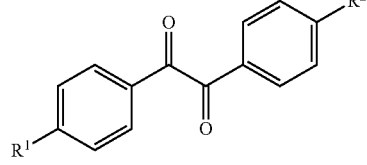
(2-8)

wherein R¹ and R² are each independently a -Sp¹—P¹ group, a hydrogen atom, a halogen atom, a —CN group, a —NO₂ group, a —NCO group, a —NCS group, a —OCN group, a —SCN group, a —SF$_5$ group, or a C1-C12 linear or branched alkyl, aralkyl, or phenyl group;

at least one of R$^1$ and R$^2$ includes a -Sp$^1$—P$^1$ group;

P$^1$ is a polymerizable group;

Sp$^1$ is a C1-C6 linear, branched, or cyclic alkylene or alkyleneoxy group, or a direct bond;

a hydrogen atom in at least one of R$^1$ and R$^2$, when the at least one of R$^1$ and R$^2$ is a C1-C12 linear or branched alkyl, aralkyl, or phenyl group, may be replaced by a fluorine atom, a chlorine atom, or a -Sp$^1$—R$^2$ group; and a —CH$_2$— group in R$^1$ and R$^2$ may be substituted with an —O— group, a —S— group, a —NH— group, a —CO— group, a —COO— group, a —OCO— group, a —O—COO— group, a —OCH$_2$— group, a —CH$_2$O— group, a —SCH$_2$ group, a —CH$_2$-S— group, a —N(CH$_3$)— group, a —N(C$_2$H$_5$)— group, a —N(C$_3$H$_7$)— group, a —N(C$_4$H$_9$)— group, a —CF$_2$O— group, a —OCF$_2$— group, a —CF$_2$S— group, a —SCF$_2$— group, a —N(CF$_3$)— group, a —CH$_2$CH$_2$— group, a —CF$_2$CH$_2$— group, a —CF$_2$CF$_2$— group, a —CH=CH— group, a —CF=CF— group, a —C≡C— group, a —CH=CH—COO— group, or a —OCO—CH=CH— group, provided that oxygen atoms, sulfur atoms and nitrogen atoms are mutually apart.

8. A liquid crystal display device comprising a pair of substrates, and a liquid crystal layer disposed between the pair of substrates, wherein the liquid crystal layer includes a liquid crystal material, at least one of the pair of substrates comprises an alignment film for controlling the alignment of adjacent liquid crystal molecules, and a polymer layer that is formed on the alignment film and controls the alignment of the adjacent liquid crystal molecules, the polymer layer is formed by polymerization of at least a first compound included in a composition for forming the liquid crystal layer, and the first compound has a structure that generates ketyl radicals when undergoing a hydrogen abstraction reaction caused by exposure to light, wherein the first compound is represented by the following chemical formula (1):

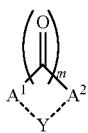

(1)

wherein A$^1$ and A$^2$ are each independently a benzene ring, a biphenyl ring, or a C1-C12 linear or branched alkyl or alkenyl group;

one of A$^1$ and A$^2$ is a benzene ring or a biphenyl ring;

at least one of A$^1$ and A$^2$ includes a -Sp$^1$—P$^1$ group;

a hydrogen atom in A$^1$ and A$^2$ may be replaced by a -Sp$^1$—P$^1$ group, a halogen atom, a —CN group, a —NO$_2$ group, a —NCO group, a —NCS group, a —OCN group, a —SCN group, a —SF$_5$ group, or a C1-C12 linear or branched alkyl, alkenyl, or aralkyl group;

two adjacent hydrogen atoms in A$^1$ or A$^2$ may be substituted with a C1-C12 linear or branched alkylene or alkenylene group to form a ring structure;

a hydrogen atom in the alkyl, alkenyl, alkylene, alkenylene, or aralkyl group of the A$^1$ and A$^2$ may be replaced by a -Sp$^1$—P$^1$ group;

a —CH$_2$— group in the alkyl, alkenyl, alkylene, alkenylene, or aralkyl group of A$^1$ and A$^2$ may be substituted with an —O— group, a —S— group, a —NH— group, a —CO— group, a —COO— group, a —OCO— group, a —O—COO— group, a —OCH$_2$— group, a —CH$_2$O— group, a —SCH$_2$— group, a —CH$_2$S— group, a —N(CH$_3$)— group, a —N(C$_2$H$_5$)— group, a —N(C$_3$H$_7$)— group, a —N(C$_4$H$_9$)— group, a —CF$_2$O— group, a —OCF$_2$— group, a —CF$_2$S— group, a —SCF$_2$— group, a —N(CF$_3$)— group, a —CH$_2$CH$_2$— group, a —CF$_2$CH$_2$— group, a —CH$_2$CF$_2$— group, a —CF$_2$CF$_2$— group, a —CH=CH— group, a —CF=CF— group, a —C≡C— group, a —CH=CH—COO— group, or a —OCO—CH=CH— group, provided that oxygen atoms, sulfur atoms and nitrogen atoms are mutually apart;

P$^1$ is a polymerizable group;

Sp$^1$ is a C1-C6 linear, branched or cyclic alkylene or alkyleneoxy group, or a direct bond;

m is 1 or 2;

a dotted line connecting A$^1$ and Y, and a dotted line connecting A$^2$ and Y show an optional bond between A$^1$ and A$^2$ mediated by Y; and Y is a —CH$_2$— group, a —CH$_2$CH$_2$— group, a —CH=CH— group, a —O— group, a —S— group, a —NH— group, a —N(CH$_3$)— group, a —N(C$_2$H$_5$)— group, a —N(C$_3$H$_7$)— group, a —N(C$_4$H$_9$)— group, a —OCH$_2$— group, a —CH$_2$O— group, a —SCH$_2$— group, a —CH$_2$S— group, or a direct bond.

9. The liquid crystal display device according to claim 8, wherein the m is 1.

10. The liquid crystal display device according to claim 9, wherein the first compound has any of structures represented by the following formulae (2-1) to (2-6):

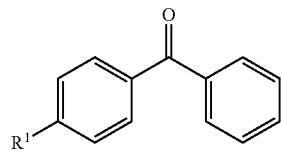

(2-1)

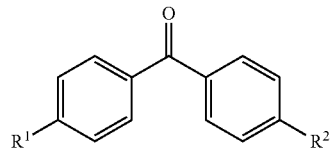

(2-2)

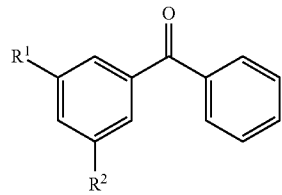

(2-3)

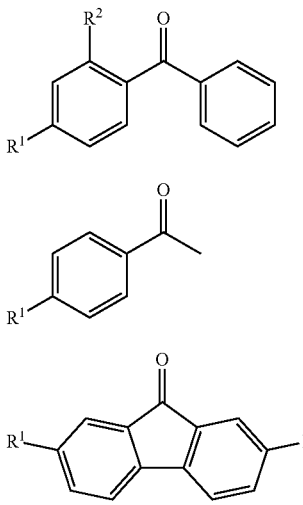

(2-4)

(2-5)

(2-6)

wherein R¹ and R² are each independently a -Sp¹—P¹ group, a hydrogen atom, a halogen atom, a —CN group, a —NO₂ group, a —NCO group, a —NCS group, a —OCN group, a —SCN group, a —SF₅ group, or a C1-C12 linear or branched alkyl, aralkyl, or phenyl group;

at least one of R¹ and R² includes a -Sp¹—P¹ group;

P¹ is a polymerizable group;

Sp¹ is a C1-C6 linear, branched, or cyclic alkylene or alkyleneoxy group, or a direct bond;

a hydrogen atom in at least one of R¹ and R², when the at least one of R¹ and R² is a C1-C12 linear or branched alkyl, aralkyl, or phenyl group, may be replaced by an fluorine atom, a chlorine atom, or a -Sp¹—P¹ group; and a —CH₂— group in R¹ and R² may be substituted with an —O— group, a —S— group, a —NH— group, a —CO— group, a —COO— group, a —OCO— group, a —O—COO— group, a —OCH₂— group, a —CH₂O— group, a —SCH₂— group, a —CH₂S— group, a —N(CH₃)— group, a —N(C₂H₅)— group, a —N(C₃H₇)— group, a —N(C₄H₉)— group, a —CF₂O— group, a —OCF₂— group, a —CF₂S— group, a —SCF₂— group, a —N(CF₃)— group, a —CH₂CH₂— group, a —CF₂CH₂— group, a —CH₂CF₂— group, a —CF₂CF₂— group, a —CH═CH— group, a —CF═CF— group, a —C≡C— group, a —CH═CH—COO— group, or a —OCO—CH═CH— group, provided that oxygen atoms, sulfur atoms and nitrogen atoms are mutually apart.

11. The liquid crystal display device according to claim 8, wherein the first compound has any of structures represented by the following formulae (2-7) and (2-8):

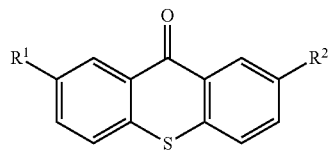

(2-7)

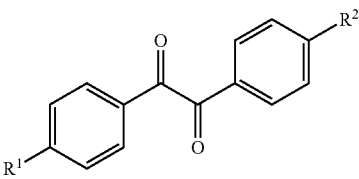

(2-8)

wherein R¹ and R² are each independently a -Sp¹—P¹ group, a hydrogen atom, a halogen atom, a —CN group, a —NO₂ group, a —NCO group, a —NCS group, a —OCN group, a —SCN group, a —SF₅ group, or a C1-C12 linear or branched alkyl, aralkyl, or phenyl group;

at least one of R¹ and R² includes a -Sp¹—P¹ group;

P¹ is a polymerizable group;

Sp¹ is a C1-C6 linear, branched, or cyclic alkylene or alkyleneoxy group, or a direct bond;

a hydrogen atom in at least one of R¹ and R², when the at least one of R¹ and R² is a C1-C12 linear or branched alkyl, aralkyl, or phenyl group, may be replaced by a fluorine atom, a chlorine atom, or a -Sp¹—P¹ group; and a —CH₂— group in R¹ and R² may be substituted with a —O— group, a —S— group, a —NH— group, a —CO— group, a —COO— group, a —OCO— group, a —O—COO— group, a —OCH₂— group, a —CH₂O— group, a —SCH₂— group, a —CH₂S— group, a —N(CH₃)— group, a —N(C₂H₅)— group, a —N(C3H₇)— group, a —N(C₄H₉)— group, a —CF₂O— group, a —OCF₂— group, a —CF₂S— group, a —SCF₂— group, a —N(CF₃)— group, a —CH₂CH₂— group, a —CF₂CH₂— group, a —CH₂CF₂— group, a —CF₂CF₂— group, a —CH═CH— group, a —CF═CF— group, a —C≡C— group, a —CH═CH—COO— group, or a —OCO—CH═CH— group, provided that oxygen atoms, sulfur atoms and nitrogen atoms are mutually apart.

12. The liquid crystal display device according to claim 8, wherein the P¹ is an acryloyloxy group, a methacryloyloxy group, a vinyl group, a vinyloxy group, an acryloylamino group, or a methacryloylamino group.

13. The liquid crystal display device according to claim 8, wherein the polymer layer is formed by polymerization of also a second compound that contains a monofunctional or polyfunctional polymerizable group having a ring structure, in addition to the polymerization of the first compound.

14. The liquid crystal display device according to claim 13, wherein the second compound that contains a monofunctional or polyfunctional polymerizable group having a ring structure is represented by the following formula (3):

(3)

wherein R³ is a —R⁴-Sp²—P² group, a hydrogen atom, a halogen atom, a —CN group, a —NO₂ group, a —NCO group, a —NCS group, an —OCN group, a —SCN group, a —SF₅ group, or a C1-C12 linear or branched alkyl group;

P² is a polymerizable group;

Sp² is a C1-C6 linear, branched, or cyclic alkylene or alkyleneoxy group, or a direct bond;

a hydrogen atom in R³ may be replaced by a fluorine atom or a chlorine atom;

a —CH₂— group in R³ may be substituted with an —O— group, a —S— group, a —NH— group, a —CO— group, a —COO— group, a —OCO— group, a —O—

COO— group, a —OCH₂— group, a —CH₂O— group, a —SCH₂— group, a —CH₂S— group, a —N(CH₃)— group, a —N(C₂H₅)— group, a —N(C₃H₇)— group, a —N(C₄H₉)— group, a —CF₂O— group, a —OCF₂— group, a —CF₂S— group, a —SCF₂— group, a —N(CF₃)— group, a —CH₂CH₂— group, a —CF₂CH₂— group, a —CH₂CF₂— group, a —CF₂CF₂— group, a —CH=CH— group, a —CF=CF— group, a —C≡C— group, a —CH=CH—COO— group, or a —OCO—CH=CH— group, provided that oxygen atoms, and sulfur atoms are mutually apart;

R⁴ is a —O— group, a —S— group, a —NH— group, a —CO— group, a —COO— group, a —OCO— group, a —O—COO— group, a —OCH₂— group, a —CH₂O— group, a —SCH₂— group, a —CH₂S— group, a —N(CH₃)— group, a —N(C₂H₅)— group, a —N(C₃H₇)— group, a —N(C₄H₉)— group, a —CF₂O— group, a —OCF₂— group, a —CF₂S— group, a —SCF₂— group, a —N(CF₃)— group, a —CH₂CH₂— group, a —CF₂CH₂— group, a —CH₂CF₂— group, a —CF₂CF₂— group, a —CH=CH— group, a —CF=CF— group, a —C≡C— group, a —CH=CH—COO— group, a —OCO—CH=CH— group, or a direct bond;

A³ and A⁴ are each independently a 1,2-phenylene group, a 1,3-phenylene group, a 1,4-phenylene group, a naphthalene-1,4-diyl group, a naphthalene-1,5-diyl group, a naphthalene-2,6-diyl group, a 1,4-cyclohexylene group, a 1,4-cyclohexenylene group, a 1,4-bicyclo[2.2.2]octylene group, a piperidine-1,4-diyl group, a naphthalene-2,6-diyl group, a decahydronaphthalene-2,6-diyl group, a 1,2,3,4-tetrahydronaphthalene-2,6-diyl group, an indane-1,3-diyl group, an indane-1,5-diyl group, an indane-2,5-diyl group, a phenanthrene-1,6-diyl group, a phenanthrene-1,8-diyl group, a phenanthrene-2,7-diyl group, a phenanthrene-3,6-diyl group, an anthracene-1,5-diyl group, an anthracene-1,8-diyl group, an anthracene-2,6-diyl group, or an anthracene-2,7-diyl group;

—CH₂— groups in A³ and A⁴ may be substituted with —O— groups or —S— groups, provided that they are mutually apart;

a hydrogen atom in A³ and A⁴ may be replaced by a fluorine atom, a chlorine atom, a —CN group, or a C1-C6 alkyl, alkoxy, alkylcarbonyl, alkoxycarbonyl, or alkylcarbonyloxy group;

Z is a —O— group, a —S— group, a —NH— group, a —CO— group, a —COO— group, a —OCO— group, a —O—COO— group, a —OCH₂— group, a —CH₂O— group, a —SCH₂— group, a —CH₂S— group, a —N(CH₃)— group, a —N(C₂H₅)— group, a —N(C₃H₇)— group, a —N(C₄H₉)— group, a —CF₂O— group, a —OCF₂— group, a —CF₂S— group, a —SCF₂— group, a —N(CF₃)— group, a —CH₂CH₂— group, a —CF₂CH₂— group, a —CH₂CF₂— group, a —CF₂CF₂— group, a —CH=CH— group, a —CF=CF— group, a —C≡C— group, a —CH=CH—COO— group, a —OCO—CH=CH— group, or a direct bond; and n is 0, 1, or 2.

15. The liquid crystal display device according to claim 14, wherein the second compound has any of structures represented by the following formulae (4-1) and (4-5):

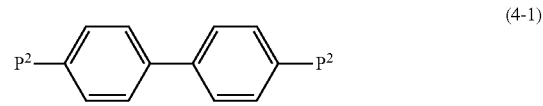
(4-1)

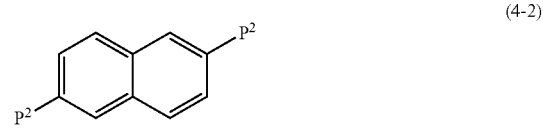
(4-2)

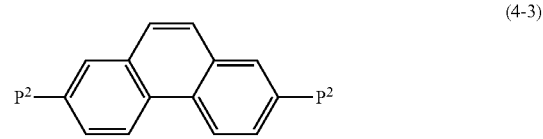
(4-3)

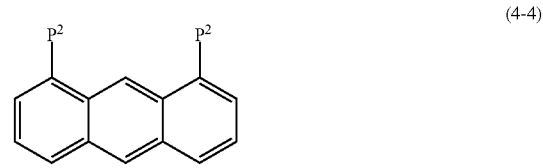
(4-4)

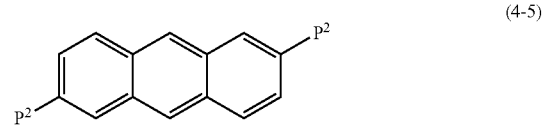
(4-5)

wherein P²s are each independently a polymerizable group.

16. The liquid crystal display device according to claim 14, wherein the P² is an acryloyloxy group, a methacryloyloxy group, a vinyl group, a vinyloxy group, an acryloylamino group, or a methacryloylamino group.

17. A composition for forming a liquid crystal layer comprising:
a liquid crystal material, and
a first compound,
the first compound having a structure that generates ketyl radicals when undergoing a hydrogen abstraction reaction caused by exposure to light,
wherein the first compound is any of compounds represented by the following formulae (2-1), (2-3) to (2-6), (2-7) and (2-8):

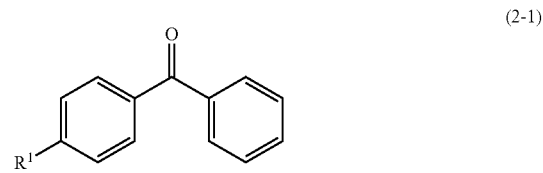
(2-1)

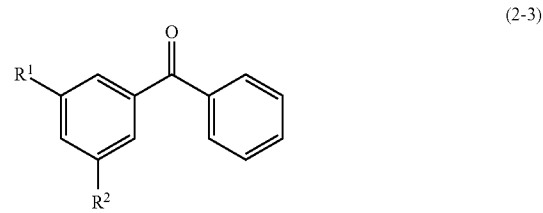
(2-3)

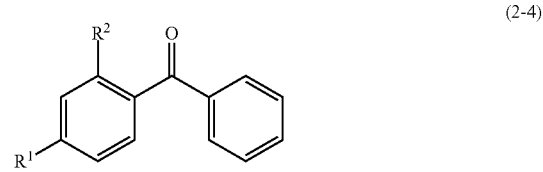
(2-4)

-continued

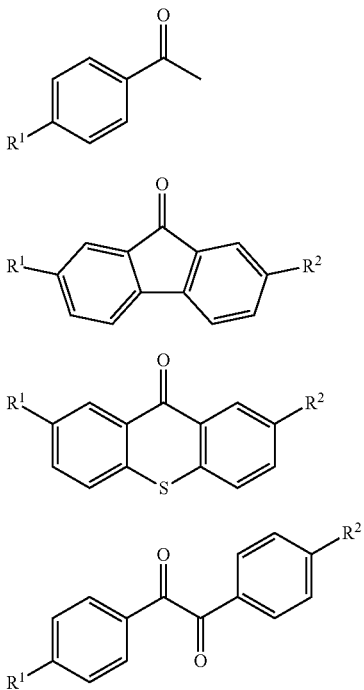

(2-5)

(2-6)

(2-7)

(2-8)

wherein $R^1$ and $R^2$ are each independently a -$Sp^1$—$P^1$ group, a hydrogen atom, a halogen atom, a —CN group, a —$NO_2$ group, a —NCO group, a —NCS group, a —OCN group, a —SCN group, a —$SF_5$ group, or a C1-C12 linear or branched alkyl, aralkyl, or phenyl group;

at least one of $R^1$ and $R^2$ includes a -$Sp^1$—$P^1$ group;

$P^1$ is a polymerizable group;

$Sp^1$ is a C1-C6 linear, branched, or cyclic alkylene or alkyleneoxy group, or a direct bond;

a hydrogen atom in at least one of $R^1$ and $R^2$, when the at least one of $R^1$ and $R^2$ is a C1-C12 linear or branched alkyl, aralkyl, or phenyl group, may be replaced by a fluorine atom, a chlorine atom, or a -$Sp^1$—$P^1$ group; and a —$CH_2$— group in $R^1$ and $R^2$ may be substituted with an —O— group, a —S— group, a —NH— group, a —CO— group, a —COO— group, a —OCO— group, a —O—COO— group, a —$OCH_2$— group a —$CH_2O$— group, a —$SCH_2$— group, a —$CH_2S$— group, a —$N(CH_3)$— group, a —$N(C_2H_5)$—group, a —$N(C_3H_7)$— group, a —$N(C_4H_9)$— group, a —$CF_2O$— group, a —$OCF_2$— group, a —$CF_2S$— group, a —$SCF_2$— group, a —$N(CF_3)$— group, a —$CH_2CH_2$— group, a —$CF_2CH_2$— group, a —$CH_2CF_2$— group, a —$CF_2CF_2$— group, a —CH=CH— group, a —CF=CF— group, a —CH=CH—COO— group, or a —OCO—CH=CH— group, provided that oxygen atoms, sulfur atoms and nitrogen atoms are mutually apart.

18. The composition for forming a liquid crystal layer according to claim 17, further comprising a second compound that contains a monofunctional or polyfunctional polymerizable group having a ring structure.

19. The composition for forming a liquid crystal layer according to claim 18,
wherein the second compound that contains a monofunctional or polyfunctional polymerizable group having a ring structure, is represented by the following formula (3):

$$P^2-S_p{}^2-R^4-A^3-(Z-A^4)_n-R^3 \quad (3)$$

wherein $R^3$ is a —$R^4$-$Sp^2$—$P^2$ group, a hydrogen atom, a halogen atom, a —CN group, a —$NO_2$ group, a —NCO group, a —NCS group, an —OCN group, a —SCN group, a —$SF_5$ group, or a C1-C12 linear or branched alkyl group;

$P^2$ is a polymerizable group;

$Sp^2$ is a C1-C6 linear, branched, or cyclic alkylene or alkyleneoxy group, or a direct bond;

a hydrogen atom in $R^3$ may be replaced by a fluorine atom or a chlorine atom;

a —$CH_2$— group in $R^3$ may be substituted with an —O— group, a —S— group, a —NH— group, a —CO— group, a —COO— group, a —OCO— group, a —O—COO— group, a —$OCH_2$— group, a —$CH_2O$— group, a —$SCH_2$— group, a —$CH_2S$— group, a —$N(CH_3)$— group, a —$N(C_2H_5)$— group, a —$N(C_3H_7)$— group, a —$N(C_4H_9)$— group, a —$CF_2O$— group, a —$OCF_2$— group, a —$CF_2S$— group, a —$SCF_2$— group, a —$N(CF_3)$— group, a —$CH_2CH_2$— group, a —$CF_2CH_2$— group, a —$CH_2CF_2$— group, a —$CF_2CF_2$— group, a —CH=CH— group, a —CF=CF— group, a —C≡C— group, a —CH=CH—COO— group, or a —OCO—CH=CH— group, provided that oxygen atoms, and sulfur atoms are mutually apart;

$R^4$ is a —O— group, a —S— group, a —NH— group, a —CO— group, a —COO— group, a —OCO— group, a —O—COO— group, a —$OCH_2$— group, a —$CH_2O$— group, a —$SCH_2$— group, a —$CH_2S$— group, a —$N(CH_3)$— group, a —$N(C_2H_5)$— group, a —$N(C_3H_7)$— group, a —$N(C_4H_9)$— group, a —$CF_2O$— group, a —$OCF_2$— group, a —$CF_2S$— group, a —$SCF_2$— group, a —$N(CF_3)$— group, a —$CH_2CH_2$— group, a —$CF_2CH_2$— group, a —$CH_2CF_2$— group, a —$CF_2CF_2$— group, a —CH=CH— group, a —CF=CF— group, a —C≡C— group, a —CH=CH—COO— group, a —OCO—CH=CH— group, or a direct bond;

$A^3$ and $A^4$ are each independently a 1,2-phenylene group, a 1,3-phenylene group, a 1,4-phenylene group, a naphthalene-1,4-diyl group, a naphthalene-1,5-diyl group, a naphthalene-2,6-diyl group, a 1,4-cyclohexylene group, a 1,4-cyclohexenylene group, a 1,4-bicyclo[2.2.2]octylene group, a piperidine-1,4-diyl group, a naphthalene-2,6-diyl group, a decahydronaphthalene-2,6-diyl group, a 1,2,3,4-tetrahydronaphthalene-2,6-diyl group, an indane-1,3-diyl group, an indane-1,5-diyl group, an indane-2,5-diyl group, a phenanthrene-1,6-diyl group, a phenanthrene-1,8-diyl group, a phenanthrene-2,7-diyl group, a phenanthrene-3,6-diyl group, an anthracene-1,5-diyl group, an anthracene-1,8-diyl group, an anthracene-2,6-diyl group, or an anthracene-2,7-diyl group;

—$CH_2$— groups in $A^3$ and $A^4$ may be substituted with —O— groups or —S— groups, provided that they are mutually apart;

a hydrogen atom in $A^3$ and $A^4$ may be replaced by a fluorine atom, a chlorine atom, a —CN group, or a C1-C6 alkyl, alkoxy, alkylcarbonyl, alkoxycarbonyl, or alkylcarbonyloxy group;

Z is a —O— group, a —S— group, a —NH— group, a —CO— group, a —COO— group, a —OCO— group, a —O—COO— group, a —$OCH_2$— group, a —$CH_2O$— group, a —$SCH_2$— group, a —$CH_2S$— group, a —$N(CH_3)$— group, a —$N(C_2H_5)$— group, a —$N(C_3H_7)$— group, a —$N(C_4H_9)$— group, a —$CF_2O$— group, a —$OCF_2$— group, a —$CF_2S$— group, a —$SCF_2$— group, a —$N(CF_3)$— group, a —CH$_2$CH$_2$— group, a —CF$_2$CH$_2$— group, a —CH$_2$CF$_2$— group, a —CF$_2$CF$_2$— group, a —CH=CH— group, a —CF=CF— group, a —C≡C— group, a —CH=CH—COO— group, a —OCO—CH=CH— group, or a direct bond; and n is 0, 1, or 2.

20. The composition for forming a liquid crystal layer according to claim 19,
wherein the P$^2$ is an acryloyloxy, a methacryloyloxy group, a vinyl group, a vinyloxy group, an acryloylamino group, or a methacryloylamino group.

* * * * *